(12) United States Patent
Ohno et al.

(10) Patent No.: US 12,305,898 B2
(45) Date of Patent: May 20, 2025

(54) REFRIGERANT PIPE UNIT AND REFRIGERATION APPARATUS

(71) Applicant: DAIKIN INDUSTRIES, LTD., Osaka (JP)

(72) Inventors: Asahi Ohno, Osaka (JP); Fumiaki Koike, Osaka (JP); Junichi Hamadate, Osaka (JP); Masato Okuno, Osaka (JP); Naritaka Yakura, Osaka (JP); Ayumi Komaki, Osaka (JP); Nobuhiro Nojima, Osaka (JP); Takaaki Akagi, Osaka (JP); Yasutaka Ohtani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 41 days.

(21) Appl. No.: 18/182,270

(22) Filed: Mar. 10, 2023

(65) Prior Publication Data

US 2023/0213250 A1    Jul. 6, 2023

Related U.S. Application Data

(63) Continuation of application No. PCT/JP2021/024483, filed on Jun. 29, 2021.

(30) Foreign Application Priority Data

Sep. 11, 2020    (JP) ................. 2020-152922

(51) Int. Cl.
F25B 41/26    (2021.01)
F16K 11/085    (2006.01)

(52) U.S. Cl.
CPC .......... *F25B 41/26* (2021.01); *F16K 11/0853* (2013.01)

(58) Field of Classification Search
CPC .......... F25B 41/26; F25B 41/20; F25B 41/41; F25B 13/00; F25B 2400/13;
(Continued)

(56) References Cited

U.S. PATENT DOCUMENTS 3,058,718 A * 10/1962 Johnson .................. F16K 41/12
                                                                251/284
4,139,355 A    2/1979 Turner et al.
(Continued)

FOREIGN PATENT DOCUMENTS

JP    H11-023071 A    1/1999
JP    2000-274988 A    10/2000
(Continued)

OTHER PUBLICATIONS

CN 109268525 with translation; reference published Jan. 25, 2019.*
(Continued)

*Primary Examiner* — Patrick C Williams
(74) *Attorney, Agent, or Firm* — Osha Bergman Watanabe & Burton LLP

(57) ABSTRACT

A refrigerant pipe unit includes: a first plate; a second plate stacked on the first plate; and a control valve. One or both of the first plate and the second plate include a refrigerant flow path. The control valve includes: a valve body that includes a refrigerant passage communicating with the refrigerant flow path, rotates in the first plate, and changes a flow of a refrigerant in the refrigerant flow path with an amount of rotation of the valve body; and a driver that adjusts the amount of the rotation of the valve body.

10 Claims, 21 Drawing Sheets

(58) Field of Classification Search
CPC .... F25B 2500/18; F16K 11/0853; F16K 5/04; F16K 27/003; F16K 27/065; Y02B 30/70
See application file for complete search history.

(56) References Cited

U.S. PATENT DOCUMENTS

| | | | |
|---|---|---|---|
| 2004/0182458 A1 | 9/2004 | Lee | |
| 2013/0220445 A1* | 8/2013 | Bakhshi | F16K 5/204 137/315.25 |
| 2016/0139605 A1* | 5/2016 | Guidetti | F16K 3/262 137/487 |
| 2016/0161014 A1* | 6/2016 | Lv | F16K 1/34 219/121.64 |
| 2018/0022331 A1* | 1/2018 | Bruett | F16K 11/0856 137/511 |
| 2019/0136989 A1* | 5/2019 | Suzuki | F16K 11/0876 |

FOREIGN PATENT DOCUMENTS

| | | |
|---|---|---|
| JP | 2009-041812 A | 2/2009 |
| JP | 2012-067833 A | 4/2012 |
| JP | 2016-003814 A | 1/2016 |
| JP | 2016-080004 A | 5/2016 |
| JP | 2020-133997 A | 8/2020 |
| WO | 2011/003990 A2 | 1/2011 |

OTHER PUBLICATIONS

English translation of International Preliminary Report on Patentability issued in corresponding International Application No. PCT/JP2021/024483 mailed Mar. 23, 2023 (6 pages).
International Search Report issued in corresponding International Application No. PCT/JP2021/024483 mailed Aug. 3, 2021 (5 pages).
Written Opinion issued in corresponding International Application No. PCT/JP2021/024483 mailed Aug. 3, 2021 (4 bages).
Extended European Search Report issued in corresponding European Patent Application No. 21866338.3, dated Feb. 6, 2024 (6 pages).

* cited by examiner

REFRIGERANT PIPE UNIT AND REFRIGERATION APPARATUS

TECHNICAL FIELD

The present disclosure relates to a refrigerant pipe unit and a refrigeration apparatus.

BACKGROUND

In a known refrigeration apparatus including a refrigerant circuit for carrying out a vapor compression refrigeration cycle operation, refrigerant pipes through which a refrigerant flows have been integrated into one unit in order to reduce the size of the refrigerant circuit. For example, Patent Literature 1 discloses a refrigerant pipe unit including three plates that are stacked on top of each other. In this refrigerant pipe unit, a refrigerant flow path is defined between two of the stacked plates, and a valve body, such as an expansion valve or an electromagnetic valve, for controlling the flow of the refrigerant is inserted in one of the plates.

PATENT LITERATURE

PATENT LITERATURE 1: Japanese Laid-Open Patent Publication No. 2009-41812

SUMMARY

A refrigerant pipe unit according to the present disclosure includes
a first plate,
a second plate stacked on the first plate, and
a control valve.
One of or both the first plate and the second plate includes or include a refrigerant flow path.
The control valve includes
a valve body including a refrigerant passage communicating with the refrigerant flow path, the valve body rotatably disposed in the first plate, the valve body configured to change a flow of a refrigerant at the refrigerant flow path, in accordance with an amount of rotation, and
a driver configured to adjust the amount of rotation of the valve body.

DETAILED DESCRIPTION

Hereinafter, embodiments of the present disclosure will be described in detail with reference to the accompanying drawings.

First Embodiments

[Overall Configuration of Refrigeration Apparatus]

Figure 1:
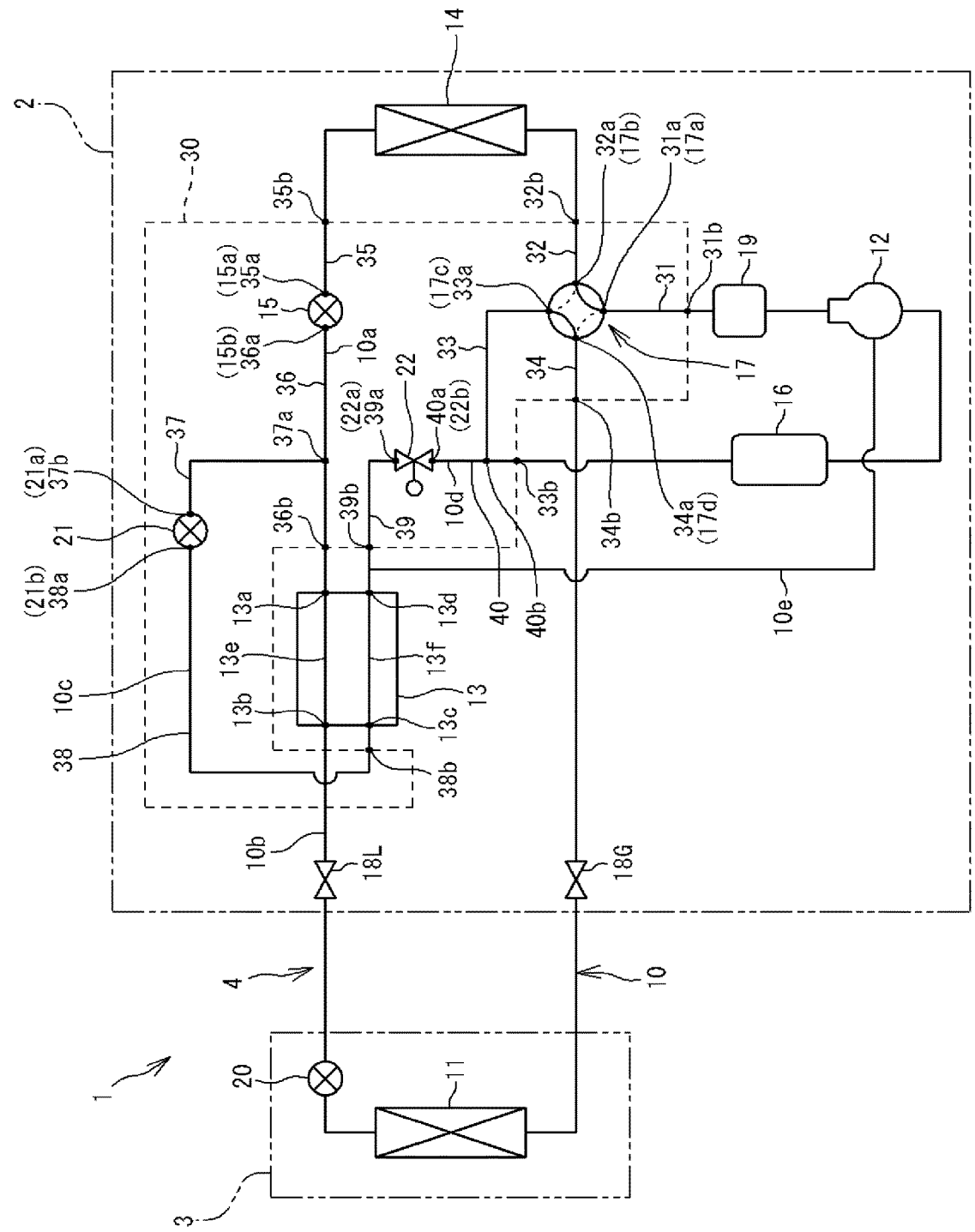
FIG. 1 is a diagram of a schematic configuration of a refrigeration apparatus to which a refrigerant pipe unit according to first embodiments of the present disclosure is applied.

FIG. 1 is a diagram of a schematic configuration of a refrigeration apparatus to which a refrigerant pipe unit according to first embodiments of the present disclosure is applied.

The refrigeration apparatus 1 is, for example, an air conditioner for cooling and heating air in a room. The refrigeration apparatus 1 includes an outdoor unit 2 installed outside the room, and an indoor unit 3 installed in the room. The outdoor unit 2 and the indoor unit 3 are connected to each other with a refrigerant pipe 10. The refrigeration apparatus 1 may include a single indoor unit 3 or may include a plurality of indoor units 3.

The refrigeration apparatus 1 includes a refrigerant circuit 4 for carrying out a vapor compression refrigeration cycle operation. The refrigerant circuit 4 includes an indoor heat exchanger 11, a compressor 12, a supercooler 13, an outdoor heat exchanger 14, an outdoor expansion valve 15, an accumulator 16, a four-way switching valve 17, shutoff valves 18L and 18G, an oil separator 19, an indoor expansion valve 20, and the like which are connected to each other with the refrigerant pipe 10.

Among the constituent components of the refrigerant circuit 4, the indoor heat exchanger 11 and the indoor expansion valve 20 are of the indoor unit 3. Among the constituent components of the refrigerant circuit 4, the compressor 12, the supercooler 13, the outdoor heat exchanger 14, the outdoor expansion valve 15, the accumulator 16, the four-way switching valve 17, the shutoff valves 18L and 18G, and the oil separator 19 are of the outdoor unit 2.

During a cooling operation carried out by the air conditioner 1, the four-way switching valve 17 is switched to a state indicated by a solid line illustrated in FIG. 1, and the outdoor heat exchanger 14 functions as a refrigerant condenser (radiator) while the indoor heat exchanger 11 functions as a refrigerant evaporator. The gas-state refrigerant discharged from the compressor 12 passes through the oil separator 19 and then flows into the outdoor heat exchanger 14. The oil separator 19 separates a refrigerating machine oil contained in the gas-state refrigerant, from the gas-state refrigerant. The outdoor heat exchanger 14 condenses the gas-state refrigerant into the liquid-state refrigerant by heat exchange with outside air. The liquid-state refrigerant then flows into the supercooler 13 via the outdoor expansion valve 15. The supercooler 13 cools the refrigerant condensed by the outdoor heat exchanger 14. After passing through the supercooler 13, the refrigerant is decompressed at the indoor expansion valve 20. The indoor heat exchanger 11 then evaporates the refrigerant by heat exchange with indoor air. The refrigerant then passes through the accumulator 16. The refrigerant is then sucked into the compressor 12. The accumulator 16 separates the gas-state refrigerant and the liquid-state refrigerant from each other. Only the gas-state refrigerant is sucked into the compressor 12.

The supercooler 13 includes a main flow path 13e and an auxiliary flow path 13f. The main flow path 13e includes a first end communicating with a first port 13a of the supercooler 13. The supercooler 13 is connected at the first port 13a to a refrigerant pipe 10a extending from the outdoor heat exchanger 14. The main flow path 13e includes a second end communicating with a second port 13b of the supercooler 13. The supercooler 13 is connected at the second port 13b to a refrigerant pipe 10b extending to the indoor heat exchanger 11.

The auxiliary flow path 13f includes a first end communicating with a third port 13c of the supercooler 13. The supercooler 13 is connected at the third port 13c to a refrigerant pipe 10c branching off the refrigerant pipe 10a. The refrigerant pipe 10c is provided with a supercooling expansion valve 21. The auxiliary flow path 13f includes a second end communicating with a fourth port 13d of the supercooler 13. The supercooler 13 is connected at the fourth port 13d to a refrigerant pipe 10d extending to the accumulator 16. The refrigerant pipe 10d is provided with an open-close valve 22. In the supercooler 13, the high-pressure liquid refrigerant flowing from the outdoor heat exchanger 14 to the main flow path 13e exchanges heat with the low-pressure gas-liquid two-phase refrigerant decompressed at the supercooling expansion valve 21 and flowing through the auxiliary flow path 13f.

The refrigeration apparatus 1 according to the present disclosure includes a refrigerant pipe unit 30 that includes one or more constituent components and refrigerant flow paths connected to and integrated with the constituent components. The refrigerant pipe unit 30 according to one or more embodiments includes the outdoor expansion valve 15, four-way switching valve 17, supercooling expansion valve 21, and open-close valve 22 as the constituent components, and some of the refrigerant pipes connected to the constituent components.

Specifically, the refrigerant pipe unit 30 includes a first flow path 31, a second flow path 32, a third flow path 33, and a fourth flow path 34. The first to fourth flow paths 31 to 34 are connected to the four-way switching valve 17. The first flow path 31 includes a first end 31a connected to a first port 17a of the four-way switching valve 17, and a second end 31b connected to a refrigerant pipe extending to the oil separator 19. The second flow path 32 includes a first end 32a connected to a second port 17b of the four-way switching valve 17, and a second end 32b connected to a refrigerant pipe extending to the outdoor heat exchanger 14.

The third flow path 33 includes a first end 33a connected to a third port 17c of the four-way switching valve 17, and a second end 33b connected to a refrigerant pipe extending to the accumulator 16. The fourth flow path 34 includes a first end 34a connected to a fourth port 17d of the four-way switching valve 17, and a second end 34b connected to a refrigerant pipe extending to the gas-side shutoff valve 18G.

The refrigerant pipe unit 30 also includes a fifth flow path 35, a sixth flow path 36, a seventh flow path 37, an eighth flow path 38, a ninth flow path 39, and a tenth flow path 40. The fifth to tenth flow paths 35 to 40 are connected to the outdoor expansion valve 15, the supercooling expansion valve 21, and the open-close valve 22. The fifth flow path 35 includes a first end 35a connected to a first port 15a of the outdoor expansion valve 15, and a second end 35b connected to a refrigerant pipe extending to the outdoor heat exchanger 14. The sixth flow path 36 includes a first end 36a connected to a second port 15b of the outdoor expansion valve 15, and a second end 36b connected to a refrigerant pipe extending to the first port 13a of the supercooler 13.

The seventh flow path 37 includes a first end 37a connected to a midway portion between two ends of the sixth flow path 36, and a second end 37b connected to a first port 21a of the supercooling expansion valve 21. The eighth flow path 38 includes a first end 38a connected to a second port 21b of the supercooling expansion valve 21, and a second end 38b connected to a refrigerant pipe extending to the third port 13c of the supercooler 13.

The ninth flow path 39 includes a first end 39a connected to a first port 22a of the open-close valve 22, and a second end 39b connected to a refrigerant pipe extending to the fourth port 13d of the supercooler 13. The tenth flow path 40 includes a first end 40a connected to a second port 22b of the open-close valve 22, and a second end 40b connected to a midway portion between two ends of the third flow path 33. A refrigerant pipe 10e for injection includes a first end connected to the compressor 12, and the refrigerant having an intermediate pressure between a suction pressure and a discharge pressure is introduced into the compressor 12 through the refrigerant pipe 10e. The refrigerant pipe 10e includes a second end connected to a midway portion between two ends of the refrigerant pipe connecting the second end 39b of the ninth flow path 39 and the fourth port 13d of the supercooler 13. When the open-close valve 22 is closed, the intermediate-pressure refrigerant is supplied to the compressor 12 through the refrigerant pipe 10e.

[Specific Configuration of Refrigerant Pipe Unit]

Figure 2:
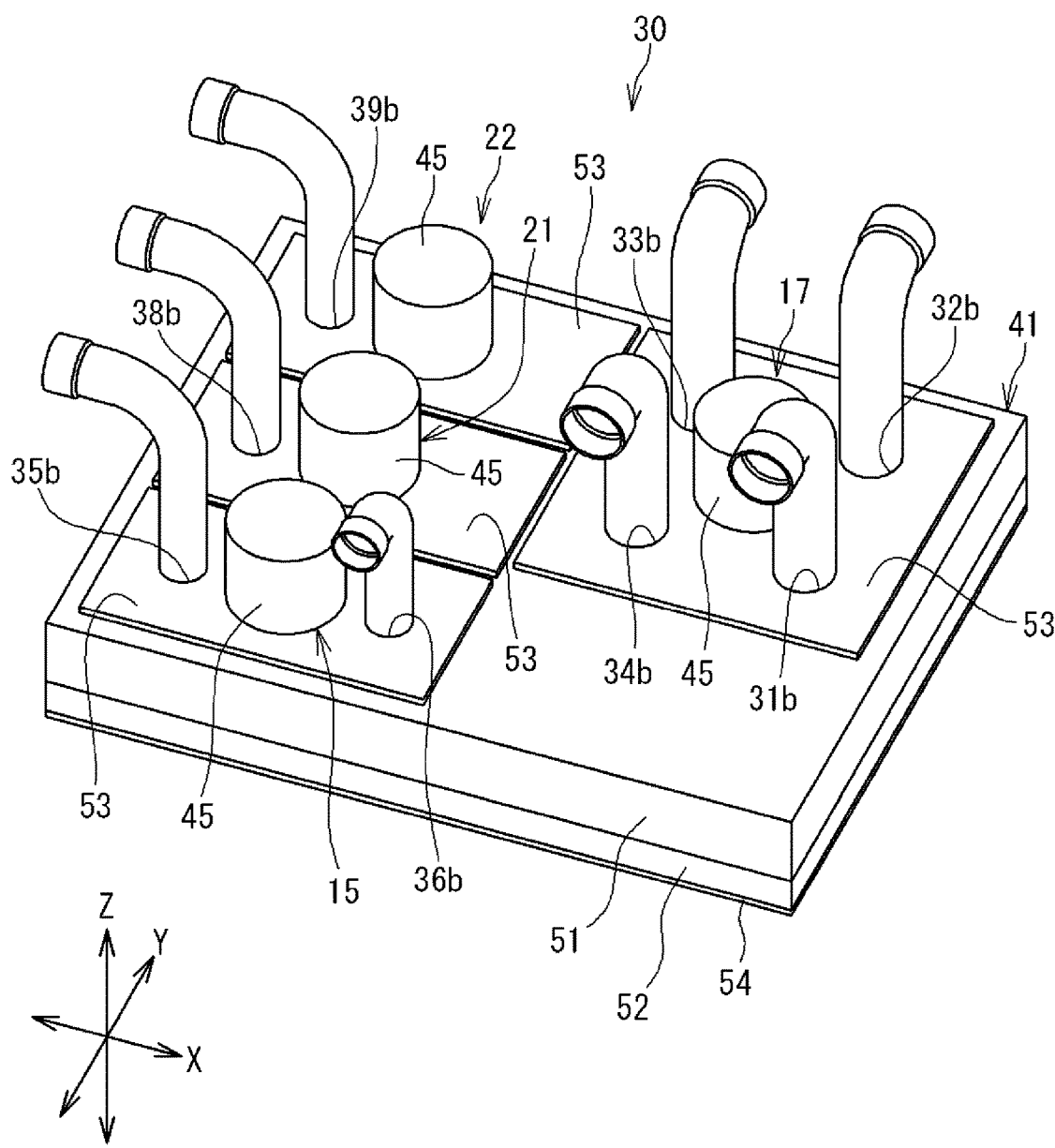
FIG. 2 is a perspective view of the refrigerant pipe unit.

Next, a description will be given of a specific structure of the refrigerant pipe unit 30. FIG. 2 is a perspective view of the refrigerant pipe unit.

The refrigerant pipe unit 30 includes a unit main body 41 and control valves 15, 17, 21, and 22. The unit main body 41 includes a plurality of plates 51 to 54 stacked on top of each other. The unit main body 41 has a flow path through which the refrigerant flows and that is defined in the unit main body 41.

The unit main body 41 includes the first plate 51, the second plate 52, the third plate 53, and the fourth plate 54. Each of the first plate 51, the second plate 52, and the fourth plate 54 is a plate member having a rectangular shape, a square shape, or the like. The first plate 51, the second plate 52, and the fourth plate 54 are equal in outer dimension to one another. Each of the plates 51 to 54 is made of metal such as aluminum, an aluminum alloy, or stainless steel. The first plate 51, the second plate 52, and the fourth plate 54 are stacked in this order and joined together by brazing. The unit main body 41 therefore includes a brazing portion for joining the plates 51, 52, and 54 together.

The first plate 51, the second plate 52, and the fourth plate 54 are different in thickness from one another. The first plate 51 is thicker than the second to fourth plates 52 to 54. The second plate 52 is thicker than the third plate 53 and the fourth plate 54.

The unit main body 41 includes a plurality of third plates 53. Each of the third plates 53 is a plate member having a rectangular shape or a square shape. Each of the third plates 53 is smaller in outer dimension than the first plate 51 and is stacked on the first plate 51. The unit main body 41 according to one or more embodiments includes four third plates 53. Each of the third plates 53 is joined to the first plate 51 by welding. The unit main body 41 therefore includes a welding portion for joining the first plate 51 and each third plate 53 together. In one or more embodiments, the term "welding" refers to welding that involves melting of a base material.

The unit main body 41 is manufactured as follows. First, the first plate 51, second plate 52, and fourth plate 54 of the unit main body 41 are joined together by brazing and integrated into one in a furnace. Next, three valve seats 46 and one valve seat 47 as well as three valve bodies 43 and one valve body 44 (to be described later) for the control valves 15, 21, 22, and 17 are respectively inserted into three accommodation holes 51j and one accommodation hole 51h in the first plate 51, and the accommodation holes 51j and 51h as well as the flow paths 31 to 40 are closed with the third plates 53. Thereafter, the third plates 53 and the first plate 51 are joined together by welding. By this manufacturing method, the first, second, and fourth plates 51, 52, and 54, which are less susceptible to a thermal influence, can be brazed collectively and, after the brazing, the control valves 15, 21, 22, and 17, which are susceptible to a thermal influence, can be mounted to the first plate 51; therefore, the manufacturability can be improved.

In the following description, a first direction Z may refer to a direction in which the first to fourth plates 51 to 54 are stacked (i.e., a normal direction of each of the first to fourth plates 51 to 54), and a second direction X and a third direction Y each may refer to a direction orthogonal to the first direction Z. In one or more embodiments, the refrigerant pipe unit 30 is placed with the first direction Z oriented in a heightwise direction.

(Configuration of Flow Path)

Figure 3:
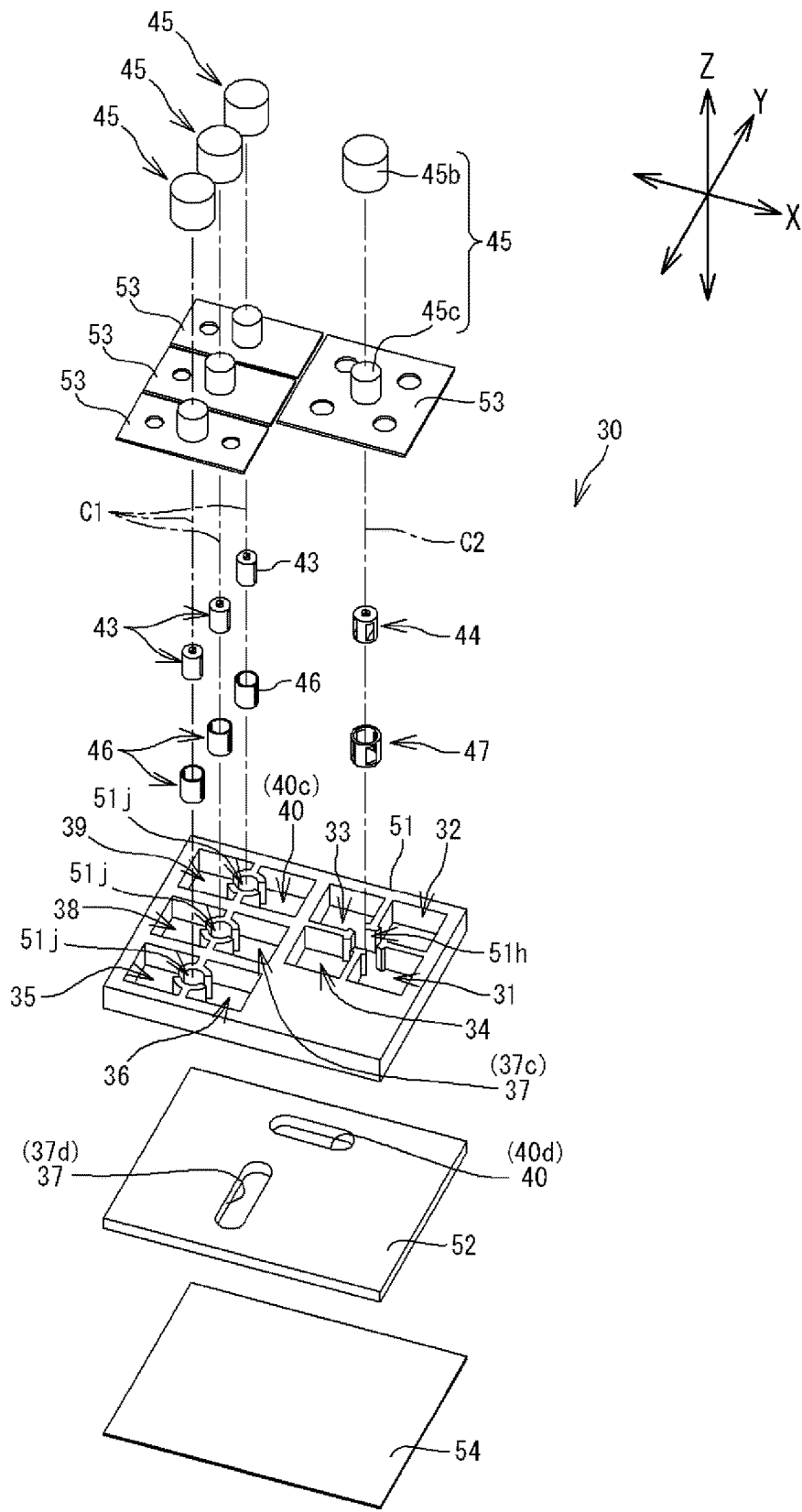
FIG. 3 is an exploded perspective view of the refrigerant pipe unit.
Figure 4:
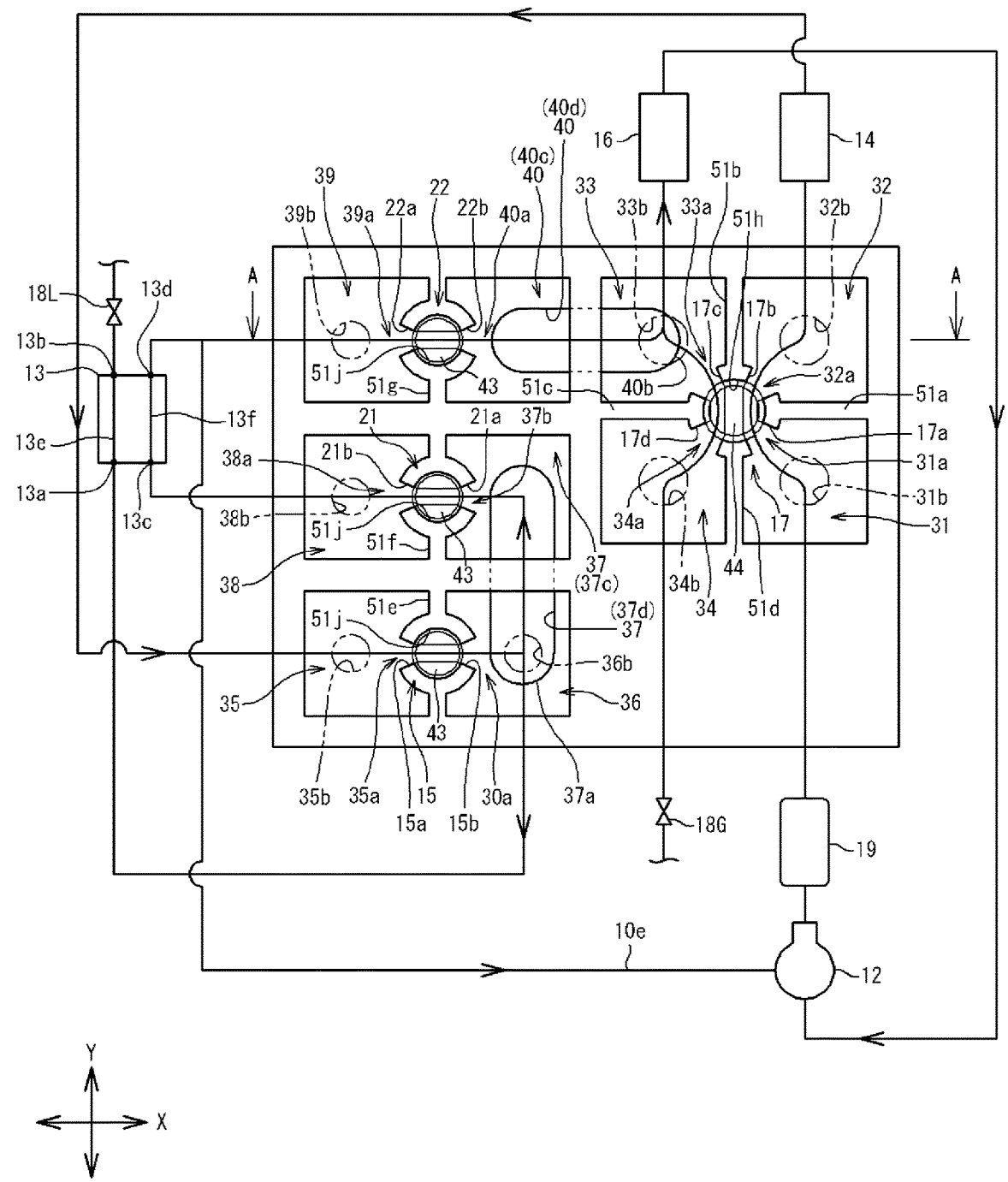
FIG. 4 is a diagram illustrating an internal structure of the refrigerant pipe unit.
Figure 10:
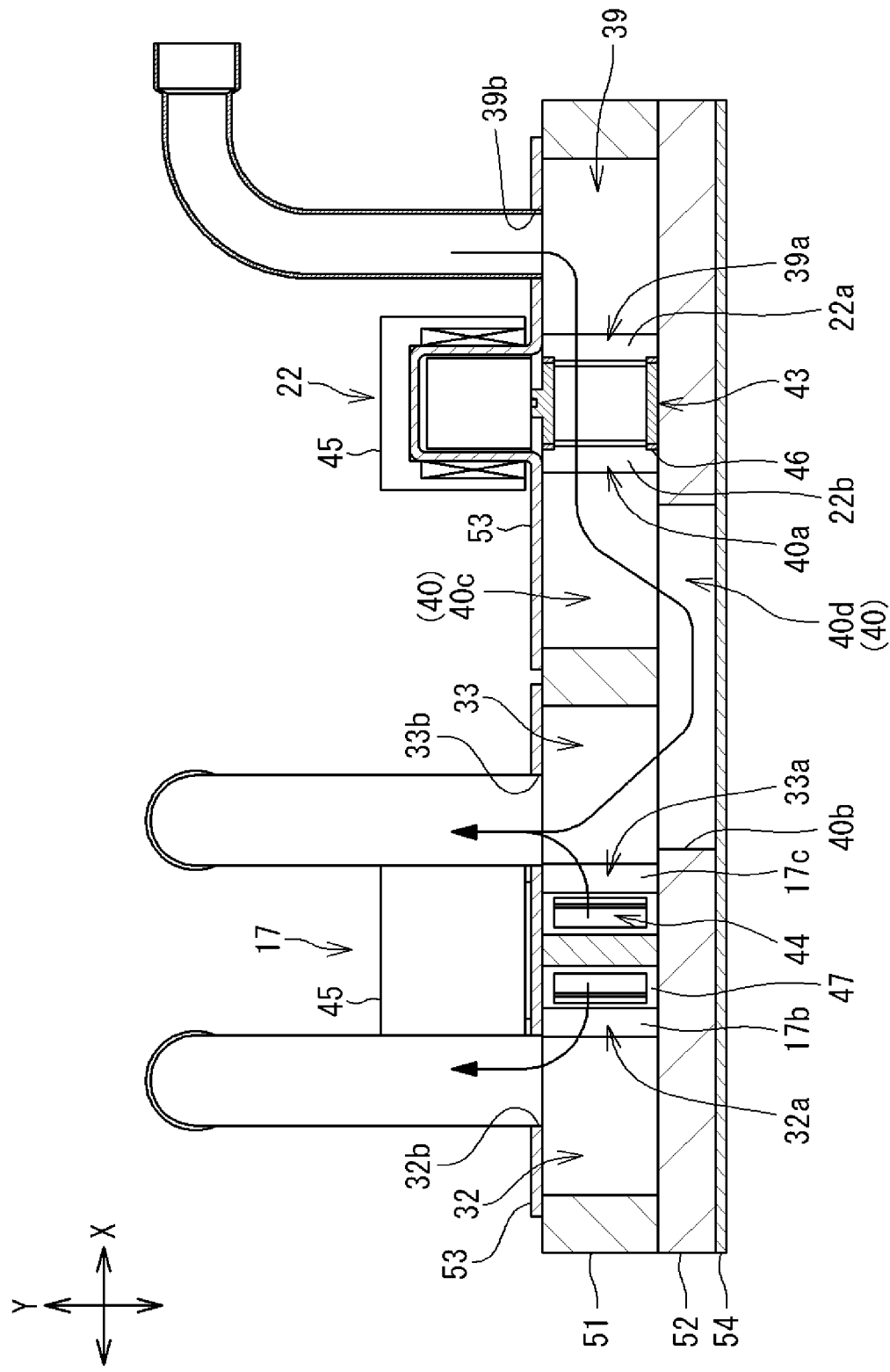
FIG. 10 is a sectional view of the refrigerant pipe unit, taken along line A-A in FIG. 4.

FIG. 3 is an exploded perspective view of the refrigerant pipe unit. FIG. 4 is a diagram illustrating an internal structure of the refrigerant pipe unit. FIG. 10 is a sectional view of the refrigerant pipe unit, taken along line A-A in FIG. 4.

The unit main body 41 includes the first to tenth flow paths 31 to 40 as described above. Specifically, the first plate 51 includes the first to tenth flow paths 31 to 40. The first to tenth flow paths 31 to 40 pass through the first plate 51 in the first direction Z. Each of the first to tenth flow paths 31 to 40 has a substantially square shape as seen in the first direction Z.

The first to fourth flow paths 31 to 34 are arranged in the second direction X and the third direction Y on a first side of the first plate 51 in the second direction X (i.e., the right side in FIG. 4). The first flow path 31 and the second flow path 32 are arranged in the third direction Y and are separated from each other with a first partition wall 51a interposed therebetween. The second flow path 32 and the third flow path 33 are arranged in the second direction X and are separated from each other with a second partition wall 51b interposed therebetween. The third flow path 33 and the fourth flow path 34 are arranged in the third direction Y and are separated from each other with a third partition wall 51c interposed therebetween. The fourth flow path 34 and the first flow path 31 are arranged in the second direction X and are separated from each other with a fourth partition wall 51d interposed therebetween.

The accommodation hole (accommodation space) 51h is located at an intersection of the first partition wall 51a, the second partition wall 51b, the third partition wall 51c, and the fourth partition wall 51d, and passes through the first plate 51 in the first direction Z. The accommodation hole 51h accommodates therein the valve body 44 of the second control valve 17 as will be described later. The accommodation hole 51h has a cylindrical inner peripheral surface.

The fifth to tenth flow paths 35 to 40 are arranged in the second direction X and the third direction Y on a second side of the first plate 51 in the second direction X (i.e., the left side in FIG. 4). The fifth flow path 35 and the sixth flow path 36 are arranged in the second direction X and are separated from each other with a fifth partition wall 51e interposed therebetween. The seventh flow path 37 and the eighth flow path 38 are arranged in the second direction X and are separated from each other with a sixth partition wall 51f interposed therebetween. The seventh flow path 37 includes a first portion 37c defined in the first plate 51 and a second portion 37d defined in the second plate 52, as will be described later.

The ninth flow path 39 and the tenth flow path 40 are arranged in the second direction X and are separated from each other with a seventh partition wall 51g interposed therebetween. The tenth flow path 40 includes a first portion 40c defined in the first plate 51 and a second portion 40d defined in the second plate 52, as will be described later. The fifth flow path 35, the eighth flow path 38, and the ninth flow path 39 are arranged in this order in the third direction Y. The sixth flow path 36, the seventh flow path 37, and the tenth flow path 40 are arranged in this order in the third direction Y.

The fifth partition wall 51e, sixth partition wall 51f, and seventh partition wall 51g respectively have the accommodation holes (accommodation spaces) 51j each passing through the first plate 51 in the first direction Z. The accommodation holes 51j respectively accommodate therein the valve bodies 43 of the first control valves 15, 21, and 22 as will be described later. The accommodation holes 51j each have a cylindrical inner peripheral surface.

As illustrated in FIG. 3, the seventh flow path 37 is defined in not only the first plate 51, but also the second plate 52. As described above, the seventh flow path 37 includes the first portion 37c defined in the first plate 51 and the second portion 37d defined in the second plate 52. The second portion 37d passes through the second plate 52 in the first direction Z. The second portion 37d is an oblong hole formed longitudinally in the third direction Y. The second portion 37d extends over the sixth flow path 36 and the first portion 37c of the seventh flow path 37 in the first plate 51, so that the sixth flow path 36 and the first portion 37c communicate with each other.

As illustrated in FIGS. 3 and 10, the tenth flow path 40 is defined in not only the first plate 51, but also the second plate 52. As described above, the tenth flow path 40 includes the first portion 40c defined in the first plate 51 and the second portion 40d defined in the second plate 52. The second portion 40d is an oblong hole formed longitudinally in the second direction X. The second portion 40d extends over the first portion 40c of the tenth flow path 40 and the third flow path 33 in the first plate, so that the first portion 40c and the third flow path 33 communicate with each other.

As illustrated in FIGS. 2, 3, and 10, the four third plates 53 close the first to tenth flow paths 31 to 40 from above. Specifically, the four third plates 53 respectively close the first to fourth flow paths 31 to 34, fifth and sixth flow paths 35 and 36, seventh and eighth flow paths 37 and 38, and ninth and tenth flow paths 39 and 40.

As illustrated in FIG. 2, the third plates 53 have through holes that define the second ends 31b to 36b of the first to sixth flow paths 31 to 36 as well as the second ends 38b and 39b of the eighth and ninth flow paths 38 and 39 (see FIG. 1). The refrigerant pipes are respectively connected to the through holes. Drivers 45 (to be described later) that constitute the control valves are respectively disposed on the third plates 53.

As illustrated in FIG. 3, the fourth plate 54 is located below the second plate 52. The fourth plate 54 has no opening and closes the second portion 37d of the seventh flow path 37 and the second portion 40d of the tenth flow path 40 in the second plate 52 from below.

(Configuration of Control Valve)

As illustrated in FIGS. 2 and 3, the control valves 17, 15, 21, and 22 are configured to control a flow of the refrigerant in the unit main body 41. The refrigerant pipe unit 30 according to one or more embodiments includes, as the control valves, the outdoor expansion valve 15, supercooling expansion valve 21, open-close valve 22, and four-way switching valve 17 described above with reference to FIG. 1. Each of the outdoor expansion valve 15, the supercooling expansion valve 21, and the open-close valve 22 is a flow rate adjustment valve configured to adjust a flow rate of the refrigerant. In the following description, a first control valve refers to this flow rate adjustment valve. The four-way switching valve 17 is a direction switching valve configured to switch a flow direction of the refrigerant. In the following description, a second control valve refers to this direction switching valve.

Each of the outdoor expansion valve 15 and the supercooling expansion valve 21 adjusts an opening degree of its corresponding valve body between a minimum opening degree and a maximum opening degree continuously or stepwise to adjust the flow rate of the refrigerant. The open-close valve 22 switches the opening degree of its valve body to either the maximum opening degree or the minimum opening degree (fully closed), thereby adjusting the flow rate of the refrigerant. In other words, the open-close valve 22 switches between a form of interrupting the flow of the refrigerant and a form of permitting the flow of the refrigerant.

Each of the outdoor expansion valve 15, the supercooling expansion valve 21, the open-close valve 22, and the four-way switching valve 17 is an electric valve operable by power supply. The valves 15, 21, and 22 respectively include the valve bodies 43 and the drivers 45. The valve 17 includes the valve body 44 and the driver 45. The valve bodies 43 and 44 are disposed in the unit main body 41. The drivers 45 are disposed outside the unit main body 41.

Figure 5:
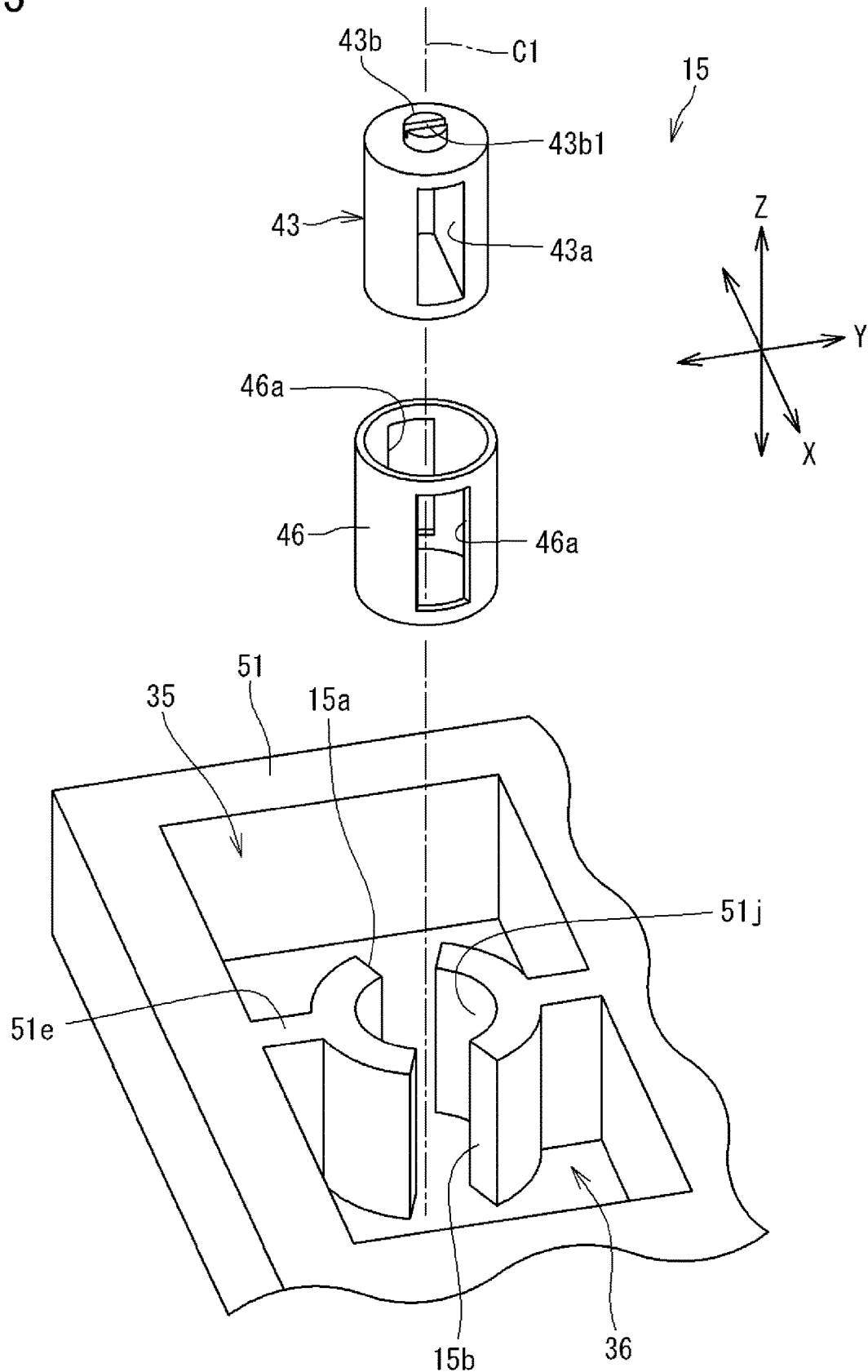
FIG. 5 is an exploded perspective view illustrating a part of a first control valve in the refrigerant pipe unit.
Figure 6:
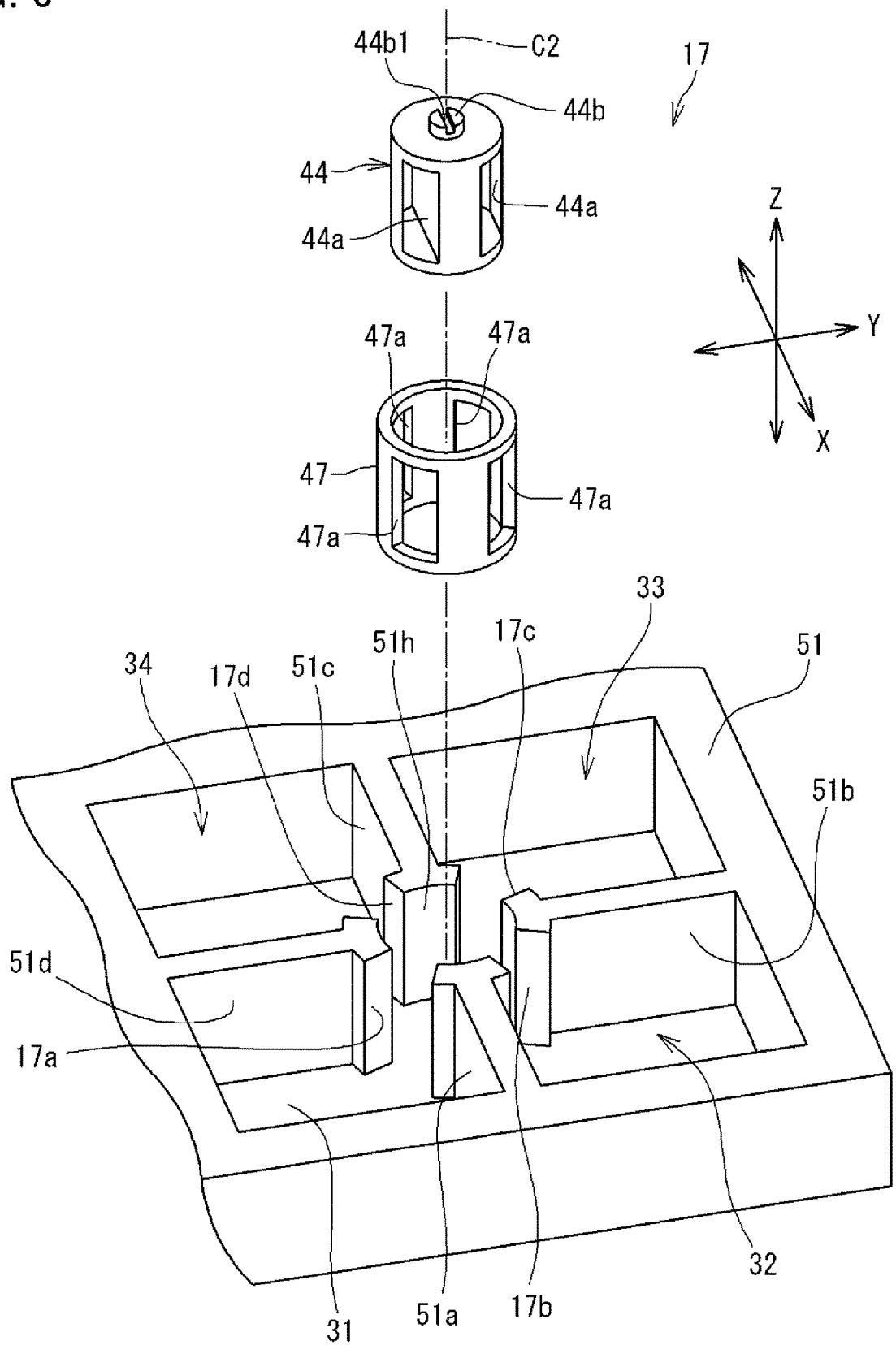
FIG. 6 is an exploded perspective view illustrating a part of a second control valve in the refrigerant pipe unit.
Figure 7:
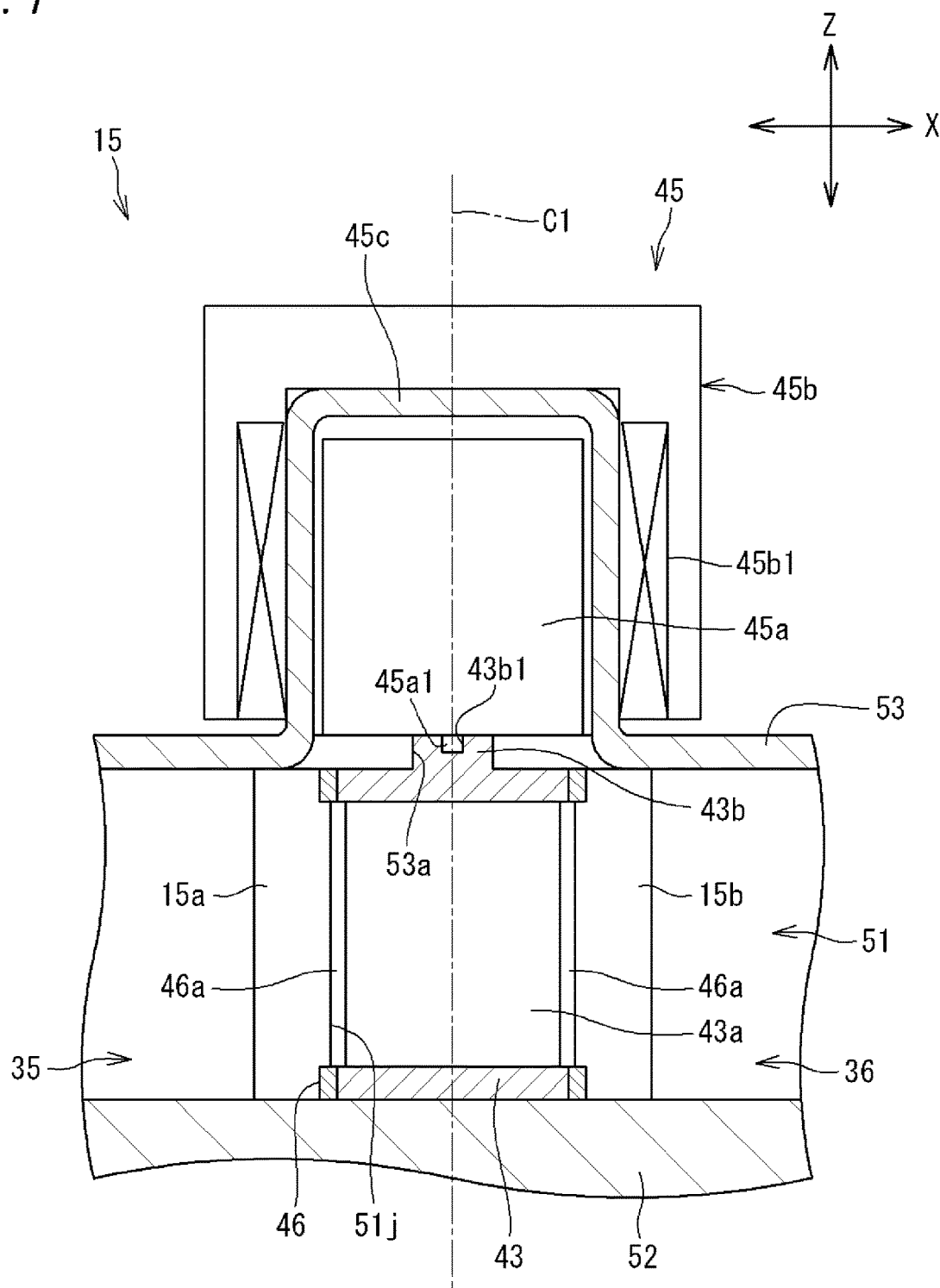
FIG. 7 is a sectional view of the first control valve.

FIG. 5 is an exploded perspective view illustrating a part of the first control valve in the refrigerant pipe unit. FIG. 6 is an exploded perspective view illustrating a part of the second control valve in the refrigerant pipe unit. FIG. 7 is a sectional view of the first control valve. It should be noted that FIGS. 5 and 7 each illustrate, as an example, the outdoor expansion valve 15 among the plurality of first control valves 15, 21, and 22. The outdoor expansion valve 15, supercooling expansion valve 21, and open-close valve 22 are basically equal in structure to each other. In the following, therefore, a description will be given of a specific structure of the outdoor expansion valve 15 as an example.

As illustrated in FIG. 5, the valve body 43 of the outdoor expansion valve 15 has a cylindrical (columnar) shape. The valve body 43 has a height in the first direction Z, and this height is substantially equal to a thickness of the first plate 51. The valve body 43 has an opening 43a passing through the valve body 43 in a direction parallel to a direction perpendicular to an axial center (i.e., central axis) C1 of the valve body 43. The opening 43a crosses the axial center C1 of the valve body 43. The opening 43a serves as a passage through which the refrigerant flows. The valve body 43 includes a cylindrical projection 43b disposed on an upper surface of the valve body 43 and located on the axial center C1. The projection 43b has on its upper surface a groove 43b1 extending in a radial direction of the projection 43b.

The valve body 43 is accommodated in the accommodation hole (accommodation space) 51j bored in the first plate 51. The axial center C1 of the valve body 43 extends in parallel with the first direction Z which is the normal direction of the first plate 51. The axial center C1 of the valve body 43 is aligned with a center of the accommodation hole 51j.

The first plate 51 has openings located around the accommodation hole 51j and serving as the first port 15a and second port 15b of the outdoor expansion valve 15. The first port 15a allows the accommodation hole 51j and the flow path 35 to communicate with each other. The second port 15b allows the accommodation hole 51j and the flow path 36 to communicate with each other. The first port 15a and the second port 15b are substantially equal in area to the opening 43a in the valve body 43.

The first plate 51 is provided with the valve seat 46 that is in contact with the valve body 43. The valve seat 46 is made of a synthetic resin and has a cylindrical shape. The valve seat 46 has a height in the first direction Z, and this height is substantially equal to the thickness of the first plate 51 in the first direction Z. The valve seat 46 has an axial center aligned with the axial center C1 of the valve bodies 43. In the following, therefore, reference sign C1 indicates the axial center of the valve seat 46 in addition to the axial center of the valve body 43.

The valve seat 46 has an outer diameter that is substantially equal to or slightly smaller than an inner diameter of the accommodation hole 51j. The valve seat 46 also has an inner diameter that is substantially equal or slightly larger than an outer diameter of the valve body 43. The valve seat 46 is fitted into the accommodation hole 51j and is fixed to the inner peripheral surface of the accommodation hole 51j. The valve body 43 is inserted in the valve seat 46 so as to be rotatable about the axial center C1.

The valve seat 46 has a pair of openings 46a passing through the valve seat 46 in a direction perpendicular to the axial center C1 of the valve seat 46. The openings 46a are arranged at positions displaced by 180 degrees in a circumferential direction of the valve seat 46. The openings 46a in the valve seat 46 are substantially equal in area to the opening 43a in the valve body 43. The valve seat 46 functions as a sealing member (i.e., seal) that seals a gap between the inner peripheral surface of the accommodation hole 51j and an outer peripheral surface of the valve body 43 to inhibit leakage of the refrigerant through the gap.

As illustrated in FIG. 6, the valve body 44 of the four-way switching valve 17 which is also referred to as the second control valve has a cylindrical (columnar) shape, as in the valve body 43 of the outdoor expansion valve 15. The valve body 44 has a height in the first direction Z, and this height is substantially equal to the thickness of the first plate 51. The valve body 44 of the four-way switching valve 17 has a pair of openings 44a passing through the valve body 44 in a direction parallel to a direction perpendicular to an axial center C2 of the valve body 44. The openings 44a extend in parallel, with the axial center C2 of the valve body 44 interposed therebetween. The openings 44a each serve as a passage through which the refrigerant flows. The valve body 44 includes a cylindrical projection 44b disposed on an upper surface of the valve body 44 and located on the axial center C2. The projection 44b has on its upper surface a groove 44b1 extending in a radial direction of the projection 44b.

The valve body 44 is accommodated in the accommodation hole (accommodation space) 51h bored in the first plate 51. The axial center C2 of the valve body 44 extends in parallel with the first direction Z which is the normal direction of the first plate 51. The axial center C2 of the valve body 44 is aligned with a center of the accommodation hole 51h.

The first plate 51 has openings located around the accommodation hole 51h and serving as the first port 17a, second port 17b, third port 17c, and fourth port 17d of the four-way switching valve 17. The first port 17a, second port 17b, third port 17c, and fourth port 17d respectively allow the accommodation hole 51h and the first flow path 31, second flow path 32, third flow path 33, and fourth flow path 34 to communicate with each other. The first port 17a, the second port 17b, the third port 17c, and the fourth port 17d are substantially equal in area to the openings 44a in the valve body 44.

The first plate 51 is provided with the valve seat 47 that is in contact with the valve body 44. The valve seat 47 is made of a synthetic resin and has a cylindrical shape. The valve seat 47 has a height in the first direction Z, and this height is substantially equal to the thickness of the first plate 51 in the first direction Z. The valve seat 47 has an axial center aligned with the axial center C2 of the valve body 44. In the following, therefore, reference sign C2 indicates the axial center of the valve seat 47 in addition to the axial center of the valve body 44.

The valve seat 47 has an outer diameter that is substantially equal to or slightly smaller than an inner diameter of the accommodation hole 51h. The valve seat 47 also has an inner diameter that is substantially equal or slightly larger than an outer diameter of the valve body 44. The valve seat 47 is fitted into the accommodation hole 51h and is fixed to the inner peripheral surface of the accommodation hole 51h. The valve body 44 is inserted in the valve seat 47 so as to be rotatable about the axial center C2.

The valve seat 47 has four openings 47a passing through the valve seat 47 in a direction perpendicular to the axial center C2 of the valve seat 47. The four openings 47a are spaced away from one another at equal intervals (90-degree intervals) in a circumferential direction of the valve seat 47. The openings 47a in the valve seat 47 are substantially equal in area to the openings 44a in the valve body 44. The openings 47a in the valve seat 47 are coincide in circumferential position with and communicate with the first port 17a, second port 17b, third port 17c, and fourth port 17d in the first plate 51, respectively. The valve seat 47 functions as a sealing member that seals a gap between the inner peripheral surface of the accommodation hole 51h and an outer peripheral surface of the valve body 44 to inhibit leakage of the refrigerant through the gap.

As illustrated in FIG. 7, the driver 45 of the outdoor expansion valve 15 is constituted of an electric motor such as a stepping motor. The driver 45 includes a rotor 45a, a stator 45b, and a cover 45c. The stator 45b includes a coil 45b1. The rotor 45a includes a projection 45a1 disposed on a lower end of the rotor 45a. The projection 45a1 of the rotor 45a is inserted in the groove 43b1 in the projection 43b of the valve body 43. The projection 45a1 of the rotor 45a and the projection 43b of the valve body 43 thus engage with each other, so that the rotor 45a and the valve body 43 are integrally rotatable about the axial center C1.

The cover 45c is a plate member made of metal such as aluminum, an aluminum alloy, or stainless steel. The cover 45c has a cylindrical shape with its upper end closed, and covers an outer peripheral portion and an upper portion of the rotor 45a. The cover 45c is integrated with the third plate 53. The stator 45b covers an outer peripheral portion and an upper portion of the cover 45c. The cover 45c may alternatively be provided separately from the third plate 53.

The driver 45 rotates the valve body 43 about the axial center C1 at a desired rotational angle in such a manner that the stator 45b excited by energization to the coil 45b 1 rotates the rotor 45a. The valve body 43 changes, in accordance with its amount of rotation, a flow rate of the refrigerant flowing through the opening 43a, and accordingly changes a flow of the refrigerant in the flow paths 35 and 36 of the unit main body 41 communicating with the opening 43a. The four-way switching valve 17, which is the second control valve, also includes a driver 45 similar in configuration to the driver 45 of the outdoor expansion valve 15.

Figure 8A:
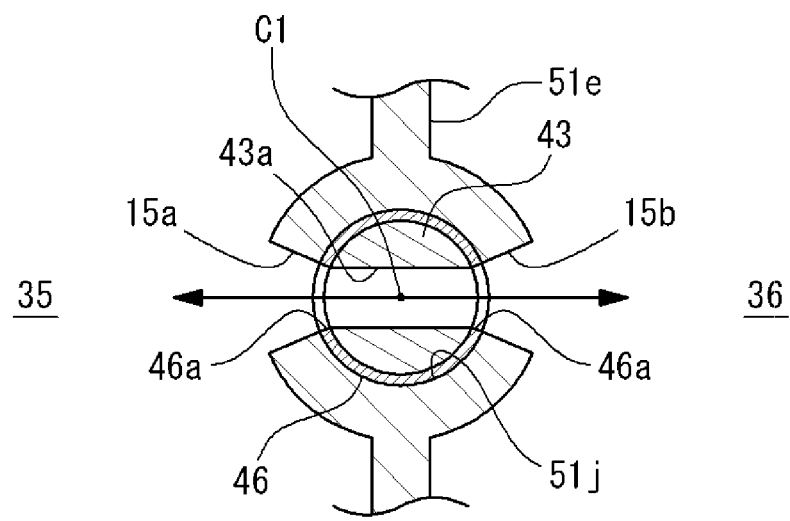
FIGS. 8A to 8C are diagrams each illustrating action of the first control valve.
Figure 8B:
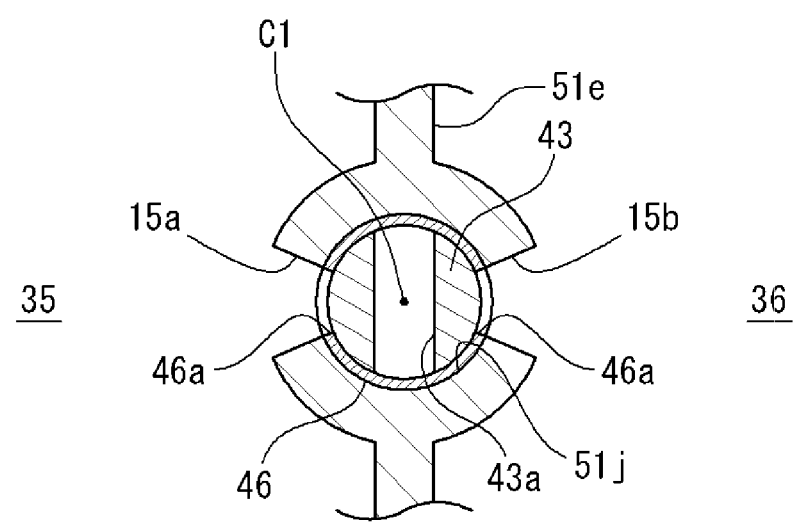
Figure 8C:
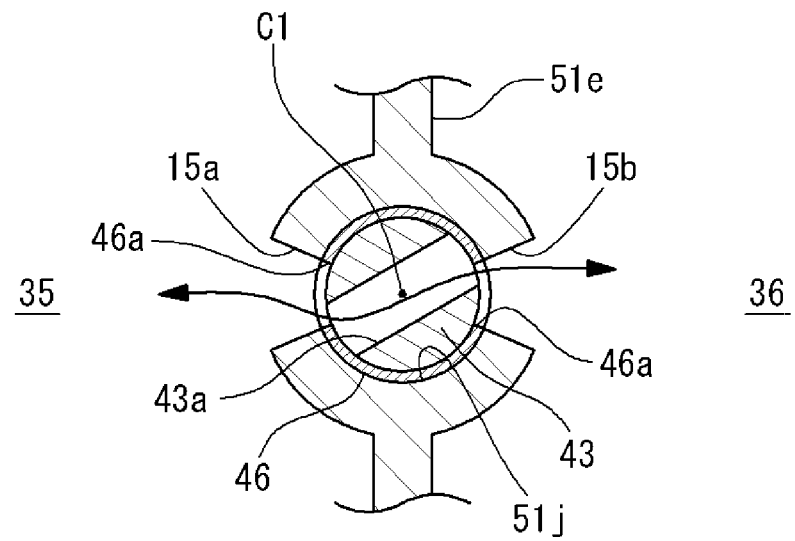

FIGS. 8A to 8C are diagrams each illustrating action of the first control valve.

The outdoor expansion valve 15, which is the first control valve, has an opening degree adjusted by a rotation of the valve body 43 to one of a state of a maximum opening degree (fully open) illustrated in FIG. 8A, a state of a minimum opening degree (fully closed) illustrated in FIG. 8B, and a state of an intermediate opening degree illustrated in FIG. 8C. At the intermediate opening degree, the amount of rotation of the valve body 43 is adjusted continuously or stepwise. The outdoor expansion valve 15 is capable of adjusting the flow rate of the refrigerant flowing through the flow paths 35 and 36, based on the adjustment to its opening degree.

The supercooling expansion valve 21, which is similar to the outdoor expansion valve 15, also has an opening degree adjusted by the rotation of the valve body 43 to one of a state of a maximum opening degree, a state of a minimum opening degree, and a state of an intermediate opening degree.

On the other hand, the open-close valve 22 has an opening degree adjusted to one of the state of the maximum opening degree illustrated in FIG. 8A and the state of the minimum opening degree illustrated in FIG. 8B. The adjustment to the opening degree enables switching between the form of permitting the flow of the refrigerant in the flow paths 35 and 36 and the form of interrupting the flow of the refrigerant in the flow paths 35 and 36.

Figure 9A:
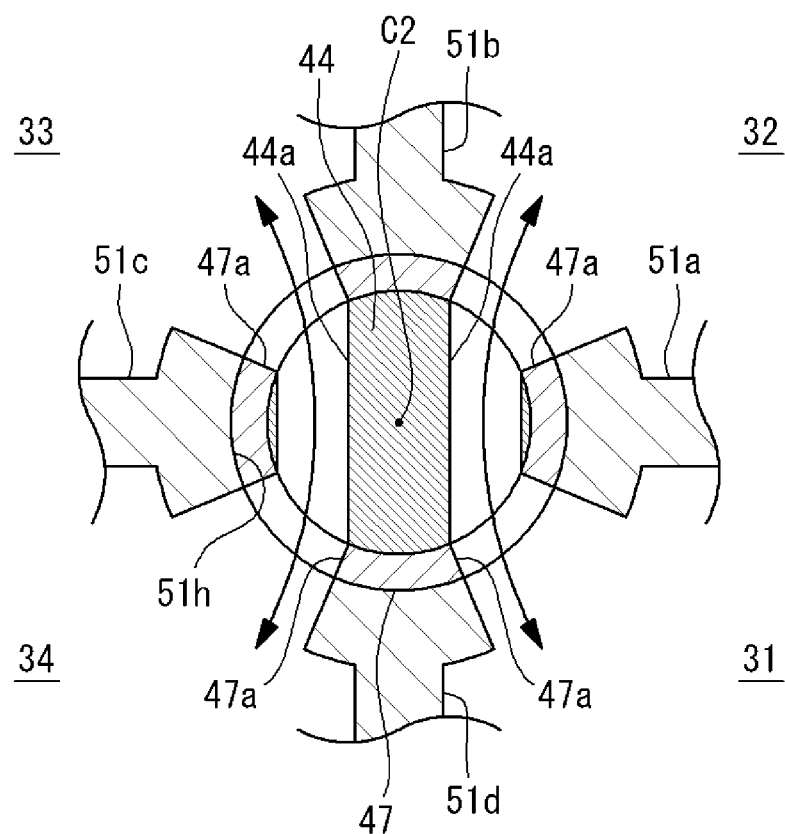
FIGS. 9A and 9B are diagrams each illustrating action of the second control valve.
Figure 9B:
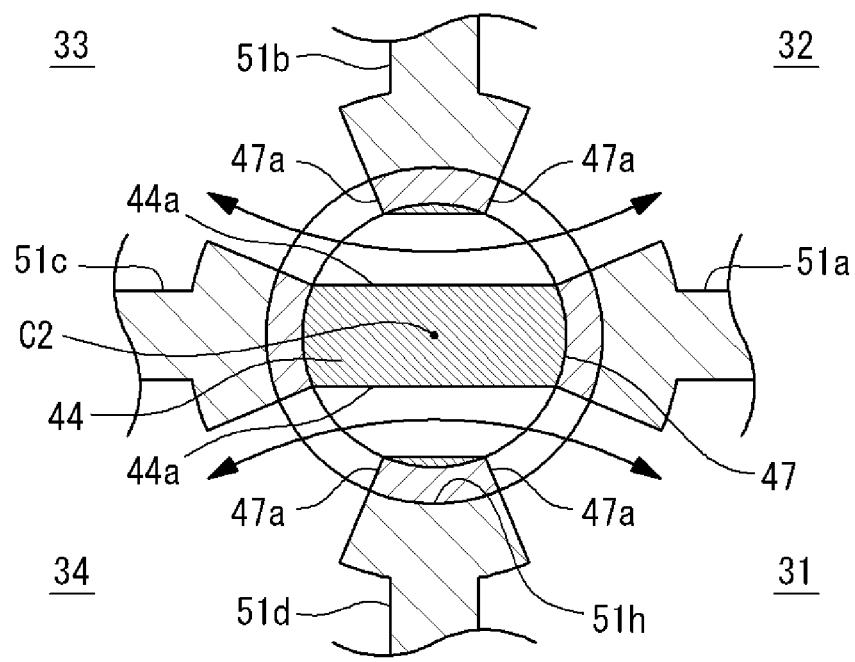

FIGS. 9A and 9B are diagrams each illustrating action of the second control valve.

The four-way switching valve 17, which is the second control valve, switches, by a rotation of the valve body 44, a flow direction of the refrigerant to one of a state in which the first flow path 31 communicates with the second flow path 32 while the third flow path 33 communicates with the fourth flow path 34 as illustrated in FIG. 9A and a state in which the first flow path 31 communicates with the fourth flow path 34 while the second flow path 32 communicates with the third flow path 33 as illustrated in FIG. 9B. The switching of the flow direction enables switching between a cooling operation and a heating operation by the air conditioner 1.

According to the first embodiments described above, the refrigerant pipe unit 30 includes the plurality of control valves 15, 21, 22, and 17, and the control valves 15, 21, 22, and 17 include the valve bodies 43 and 44 disposed on the first plate 51 in a rotatable manner. The valve bodies 43 and 44 respectively have the openings 43a and 44a each serving as a refrigerant passage. The valve bodies 43 and 44 change the flow of the refrigerant in the flow paths 31 to 40, in accordance with their amounts of rotation. The valve bodies 43 and 44 respectively rotate about the axial centers C1 and C2 extending in parallel with the normal direction Z of the first plate 51. The openings 43a and 44a are defined along the direction orthogonal to the axial centers C1 and C2. Therefore, the inlet-side flow paths through which the refrigerant flows into the openings 43a and 44a in the valve bodies 43 and 44 and the outlet-side flow paths through which the refrigerant flows out of the openings 43a and 44a can be arranged linearly, which enables a reduction in space for these flow paths.

The valve bodies 43 of the first control valves 15, 21, and 22 are respectively accommodated in the accommodation spaces 51j in the first plate 51 and are respectively in contact with the valve seats 46 of the first plate 51. The valve body 44 of the second control valve 17 is accommodated in the accommodation space 51h in the first plate 51 and is in contact with the valve seat 47 of the first plate 51. The first plate 51 therefore functions as a casing for the first control valves 15, 21, and 22 and the second control valve 17. This configuration thus achieves a reduction in size of the refrigerant pipe unit 30.

In the foregoing embodiments, the outdoor expansion valve 15, supercooling expansion valve 21, and open-close valve 22 include the valve bodies 43 of the same type and the valve seats 46 of the same type. This configuration therefore achieves a reduction in manufacturing cost by the use of common components.

In the foregoing embodiments, control valves of different types can be configured with ease by changing the structures of valve bodies to be accommodated in the accommodation spaces 51h and 51j. Any of the accommodation holes 51h and 51j may accommodate therein components different from a valve body, such as a filter.

Second Embodiments

Figure 11:
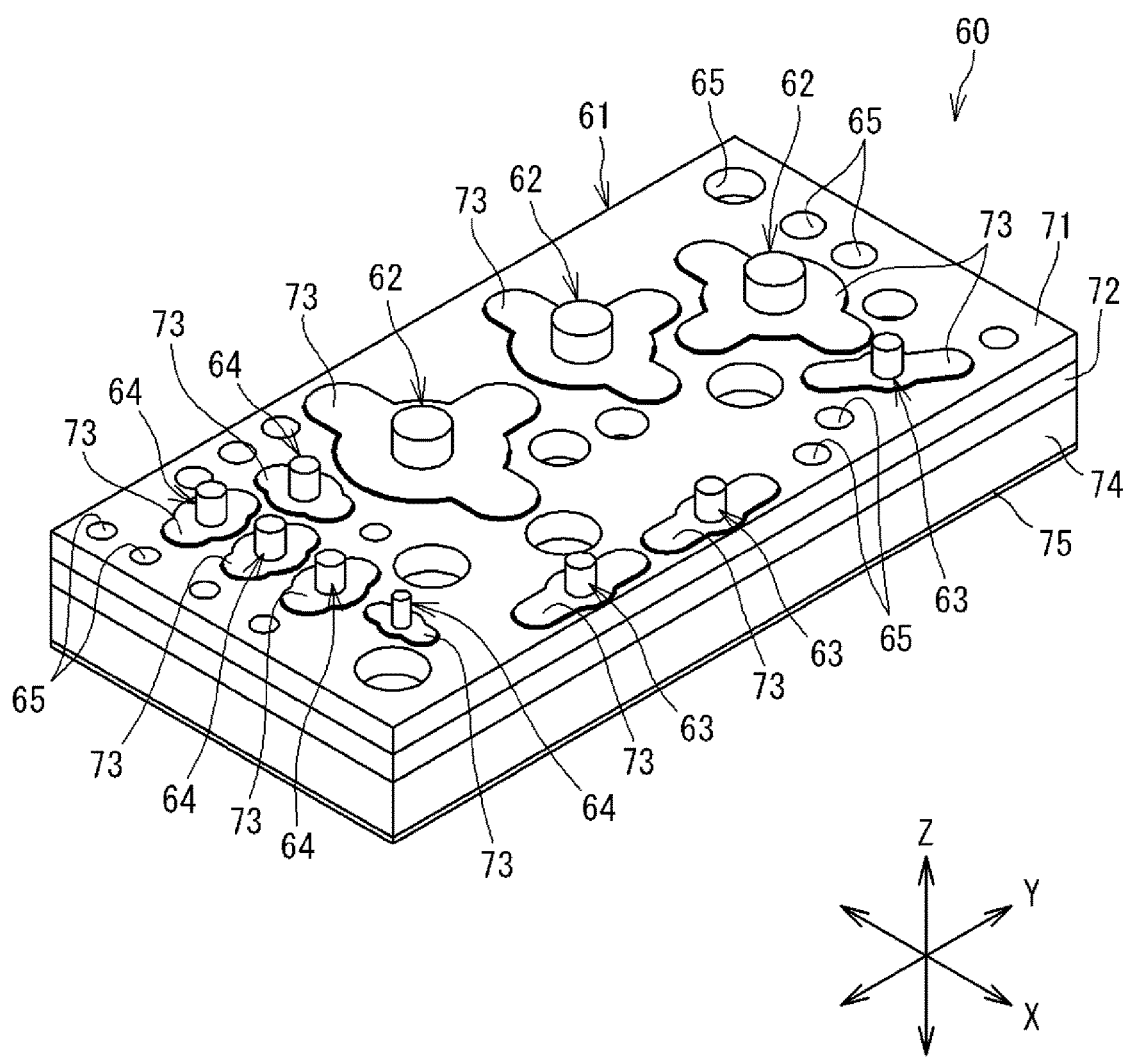
FIG. 11 is a perspective view of a refrigerant pipe unit according to second embodiments of the present disclosure.

FIG. 11 is a perspective view of a refrigerant pipe unit according to second embodiments of the present disclosure.

A refrigerant pipe unit 60 according to one or more embodiments includes a unit main body 61 and control valves 62, 63, and 64.

As in the first embodiments, the unit main body 61 includes a plurality of plates 71 to 75 stacked on top of each other. The unit main body 61 has a flow path through which a refrigerant flows and that is defined in the unit main body 61.

The unit main body 61 includes the first plate 71, the second plate 72, the third plate 73, the fourth plate 74, and the fifth plate 75. Each of the first plate 71, the second plate 72, the fourth plate 74, and the fifth plate 75 is a plate member having a rectangular shape, a square shape, or the like. The first plate 71, the second plate 72, the fourth plate 74, and the fifth plate 75 are equal in outer dimension to one another. The first plate 71, the second plate 72, the fourth plate 74, and the fifth plate 75 are stacked in this order and joined together by brazing. The unit main body 61 therefore includes a brazing portion for joining the plates 71, 72, 74, and 75 together.

The first plate 71 is substantially equal in thickness to the second plate 72. The third plate 73, the fourth plate 74, and the fifth plate 75 are different in thickness from the first plate 71 and the second plate 72. The fourth plate 74 is thicker than the first plate 71 and the second plate 72. The third plate 73 and the fifth plate 75 are thinner than the first plate 71.

The unit main body 61 includes a plurality of third plates 73. The third plates 73 have sizes that respectively cover valve bodies (to be described later) and flow paths (to be described later) through which the refrigerant flows. Each of the third plates 73 is smaller in outer dimension than the first plate 71 and is stacked on the first plate 71. The unit main body 61 according to one or more embodiments includes eleven third plates 73. Each of the third plates 73 is joined to the first plate 71 by welding. The unit main body 61 therefore includes a welding portion for joining the first plate 71 and each third plate 73 together. The first plate 71 has a plurality of holes 65 through which refrigerant pipes are connected to the flow paths in the unit main body 61.

Figure 12:
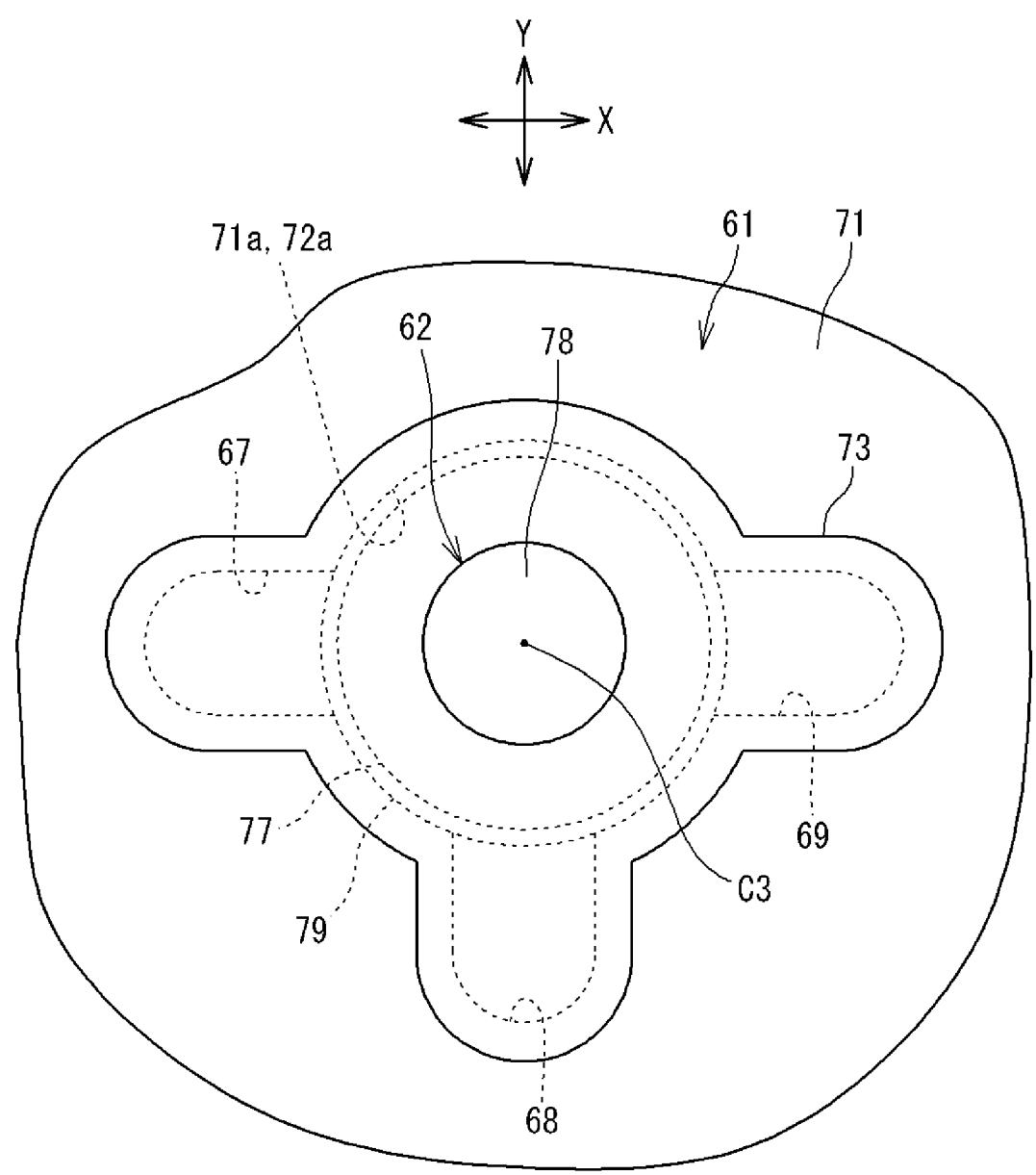
FIG. 12 is a plan view of a second control valve.

FIG. 12 is a plan view of a second control valve.

A second control valve 62 is a direction switching valve. The second control valve 62 is a three-way switching valve for adjusting a flow direction of the refrigerant by causing two of three flow paths 67, 98, and 69 defined in the first plate 71 and the like to selectively communicate with each other.

Figure 13:
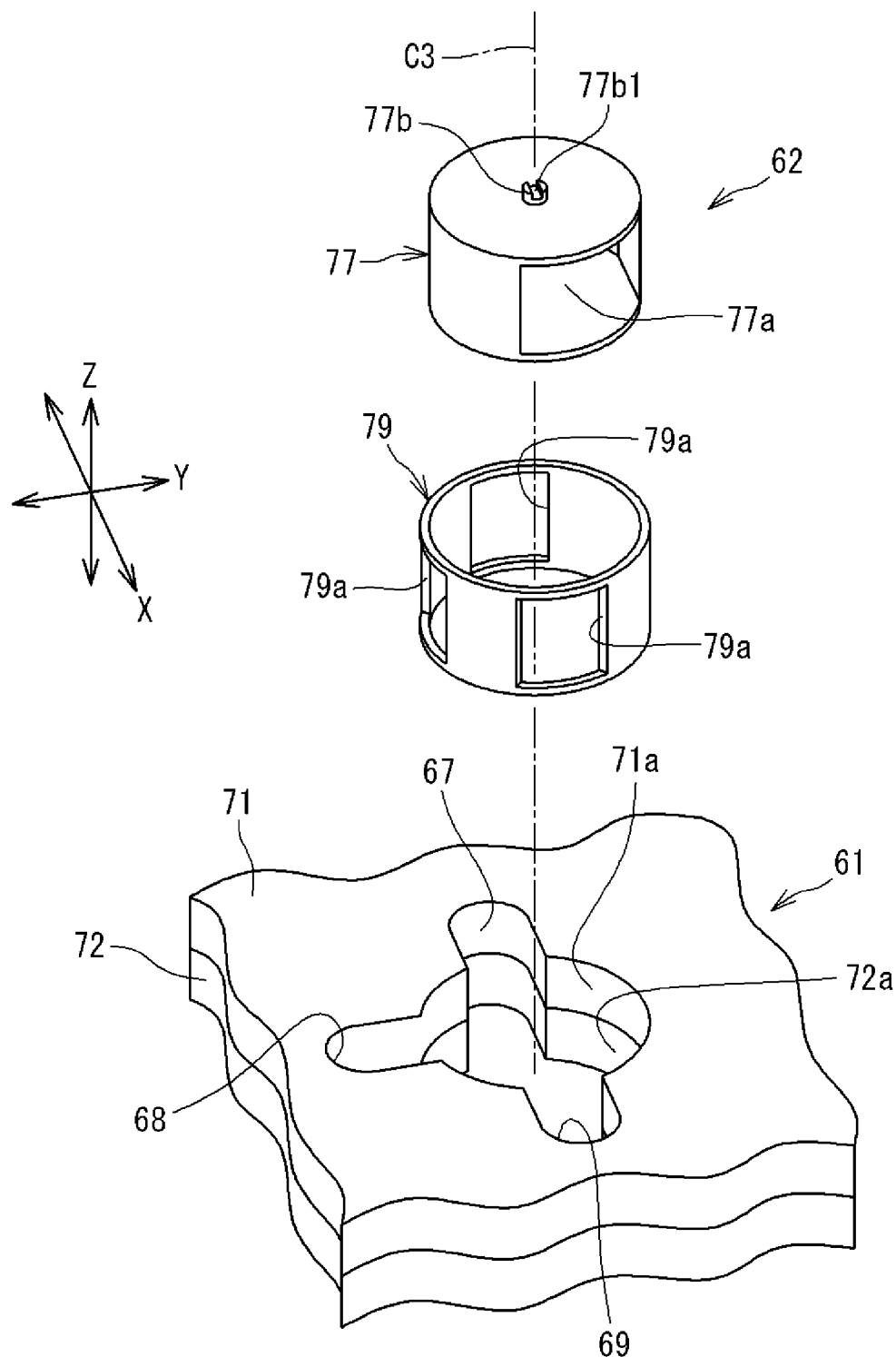
FIG. 13 is an exploded perspective view of a part of the second control valve.
Figure 15:
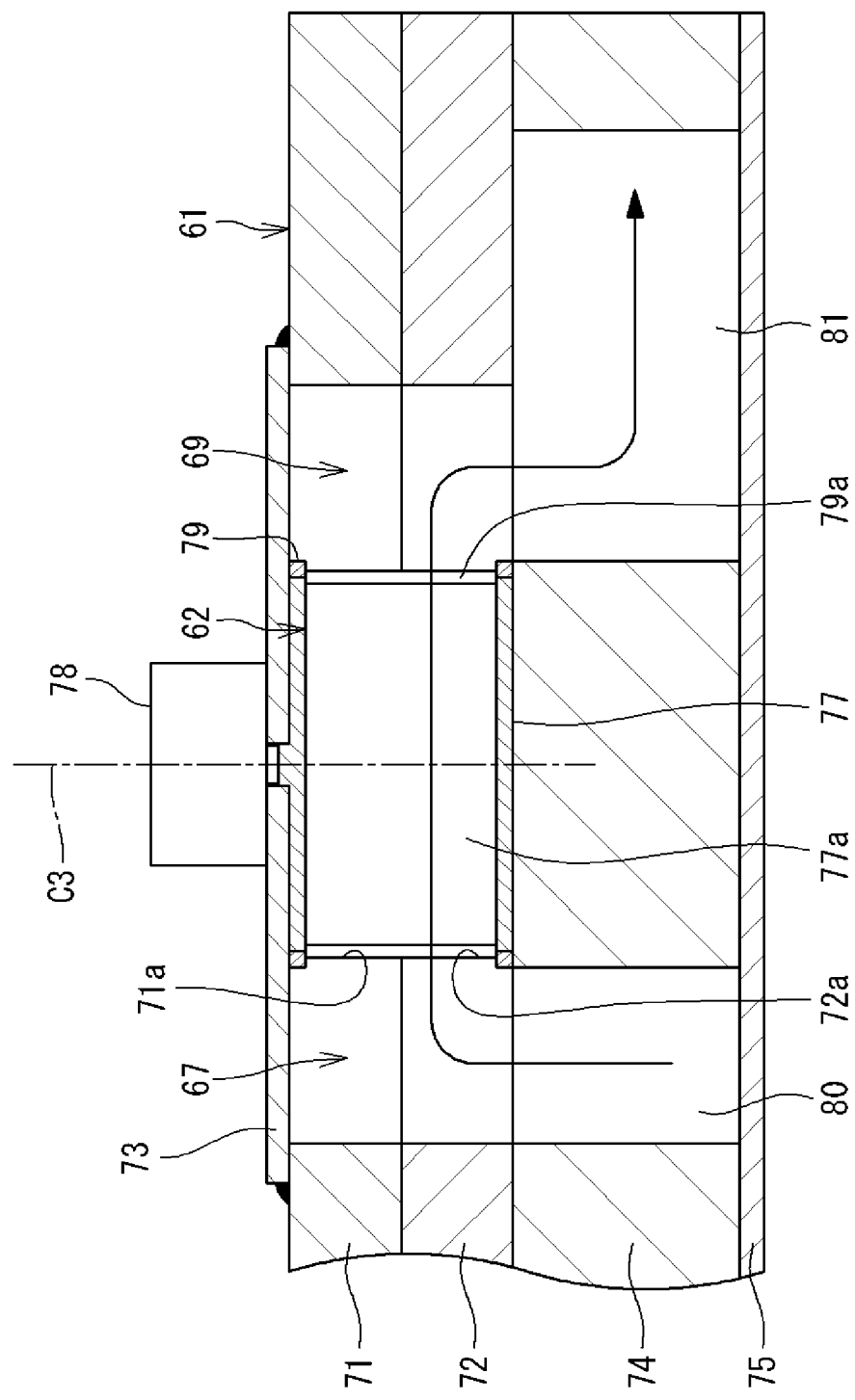
FIG. 15 is a sectional view illustrating the second control valve and a refrigerant flow path around the second control valve.

FIG. 13 is an exploded perspective view of a part of the second control valve. FIG. 15 is a sectional view illustrating the second control valve and a refrigerant flow path around the second control valve.

The first plate 71 has an accommodation hole (first accommodation space) 71a passing through the first plate 71 in the first direction Z. The second plate 72 has an accommodation hole (second accommodation space) 72a passing through the second plate 72 in the first direction Z. The accommodation holes 71a and 72a each have a cylindrical shape, are equal in inner diameter to each other, and are arranged concentrically. The first plate 71 has three flow paths 67, 68, and 69 defined around the accommodation hole 71a. The second plate 72 has three flow paths 67, 68, and 69 defined around the accommodation hole 72a. The flow path 67 and the flow path 69 are arranged in a circumferential direction of the accommodation holes 71a and 72a so as to face each other at an angle of 180 degrees. The flow path 68 is arranged in the circumferential direction of the accommodation holes 71a and 72a at an angle of 90 degrees relative to the flow path 67 and the flow path 69. The flow paths 67, 68, and 69 have widths smaller than the diameters of the accommodation holes 71a and 72a as seen in the first direction Z.

The second control valve 62 includes a valve body 77 and a driver 78. The valve body 77 is disposed in the unit main body 61. The driver 78 is disposed outside the unit main body 41. The driver 78 is equal in configuration to the driver 45 described above with reference to, for example, FIG. 7; therefore, the detailed description thereof will not be given here.

As illustrated in FIG. 13, the valve body 77 has a cylindrical (columnar) shape. The valve body 77 has a height in the first direction Z, and this height is substantially equal to a sum of a thickness of the first plate 71 and a thickness of the second plate 72. The valve body 77 has an opening 77a passing through the valve body 77 in a direction parallel to a direction perpendicular to an axial center C3 of the valve body 77. The opening 77a crosses the axial center C3 of the valve body 77. The opening 77a serves as a passage through which the refrigerant flows. The opening 77a is biased toward a first side in a radial direction, within a range that covers the axial center C3 of the valve body 77. The valve body 77 includes a cylindrical projection 77b disposed on an upper surface of the valve body 77 and located on the axial center C3. The projection 77b has on its upper surface a groove 77b1 extending in a radial direction of the projection 77b.

The valve body 77 is accommodated in the accommodation holes (accommodation spaces) 71a and 72a respectively bored in the first and second plates 71 and 72. The axial center C3 of the valve body 77 extends in parallel with the first direction Z which is the normal direction of the first plate 71. The axial center C3 of the valve body 77 is aligned with centers of the accommodation holes 71a and 72a.

The first plate 71 and the second plate 72 are provided with a valve seat 79 that is in contact with the valve body 77. The valve seat 79 is made of a synthetic resin and has a cylindrical shape. The valve seat 79 has a height in the first direction Z, and this height is substantially equal to the sum of the thickness of the first plate 71 and the thickness of the second plate 72 in the first direction Z. The valve seat 79 has an axial center aligned with the axial center C3 of the valve body 77. In the following, therefore, reference sign C3 indicates the axial center of the valve seat 79 in addition to the axial center of the valve body 77.

The valve seat 79 has an outer diameter that is substantially equal to or slightly smaller than the inner diameters of the accommodation holes 71a and 72a. The valve seat 79 also has an inner diameter that is substantially equal or slightly larger than an outer diameter of the valve body 77. The valve seat 79 is fitted into the accommodation holes 71a and 72a and is fixed to inner peripheral surfaces of the accommodation holes 71a and 72a. The valve body 77 is inserted in the valve seat 79 so as to be rotatable about the axial center C3.

The valve seat 79 has three openings 79a passing through the valve seat 79 in a direction perpendicular to the axial center C3 of the valve seat 79. The three openings 79a are spaced away from one another at an angle of 90 degrees in a circumferential direction of the valve seat 79. The openings 79a in the valve seat 79 are coincide in circumferential position with and communicate with the flow paths 67, 68, and 69, respectively. The valve seat 79 functions as a sealing member that seals a gap between the inner peripheral surfaces of the accommodation holes 71a and 72a and an outer peripheral surface of the valve body 77 to inhibit leakage of the refrigerant through the gap.

As illustrated in FIG. 15, the fourth plate 74 includes flow paths 80 and 81 respectively communicating with the flow paths 67 and 69 in the first plate 71 and second plate 72.

The fifth plate 75 is located below the fourth plate 74 so as to close the flow paths 80 and 81 from below.

Figure 14A:
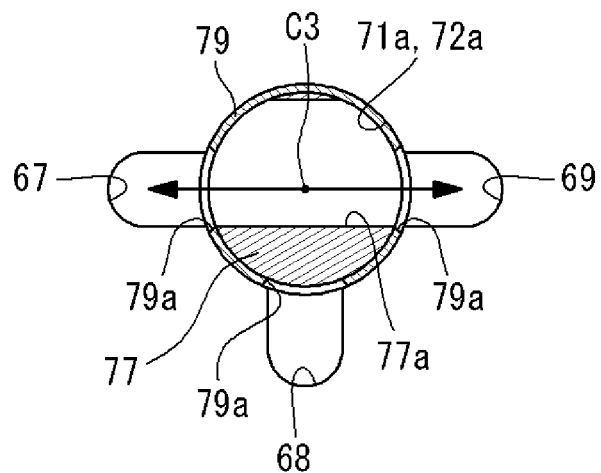
FIGS. 14A to 14C are diagrams each illustrating action of the second control valve.
Figure 14B:
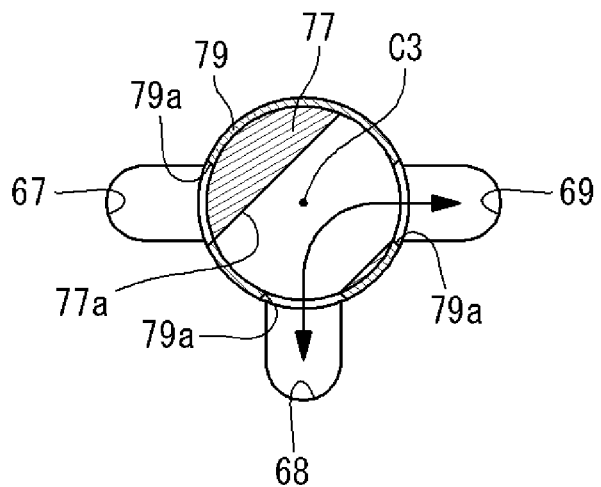
Figure 14C:
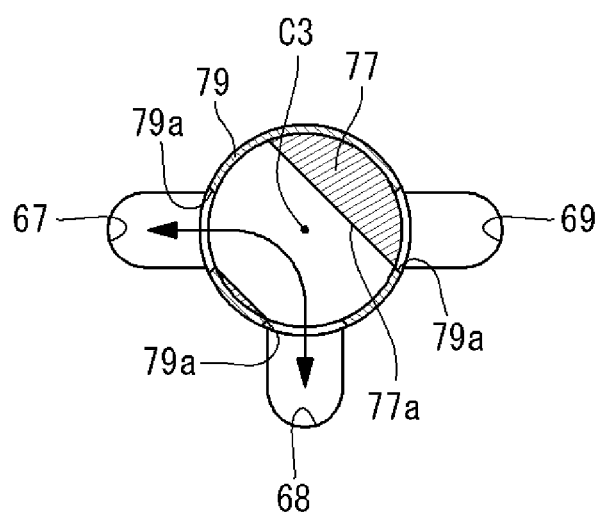

FIGS. 14A to 14C are diagrams each illustrating action of the second control valve.

The second control valve 62 switches, in accordance with an amount of rotation of the valve body 77, a flow direction of the refrigerant to one of a state in which the flow path 67 and the flow path 69, which face each other at an angle of 180 degrees, communicate with each other as illustrated in FIG. 14A, a state in which the flow path 68 and the flow path 69, which are spaced away from each other at an angle of 90 degrees, communicate with each other as illustrated in FIG. 14B, and a state in which the flow path 67 and the flow path 68, which are spaced away from each other at an angle of 90 degrees, communicate with each other as illustrated in FIG. 14C.

Figure 16:
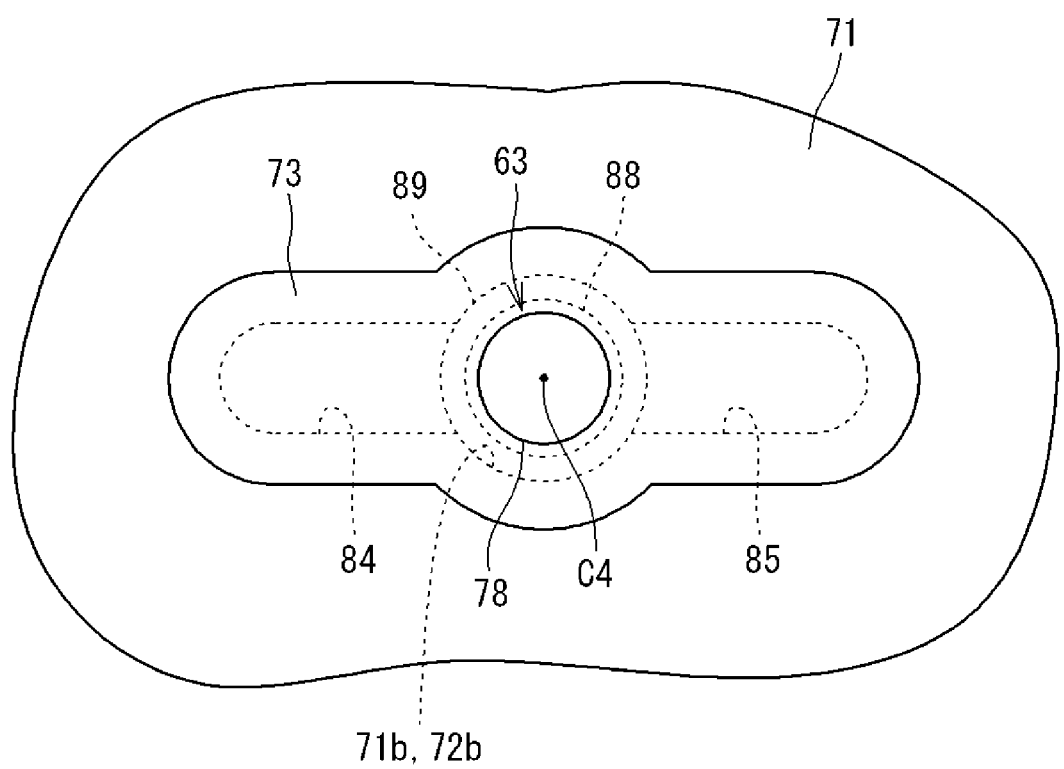
FIG. 16 is a plan view of a first control valve.

FIG. 16 is a plan view of a first control valve.

A first control valve 63 is a flow rate adjustment valve. The first control valve 63 changes a flow of the refrigerant at two flow paths 84 and 85 defined in the first plate 71. The first control valve 63 includes a valve body 88 and a driver 78. The driver 78 is equal in configuration to the driver 45 described above with reference to, for example, FIG. 7.

Figure 17:
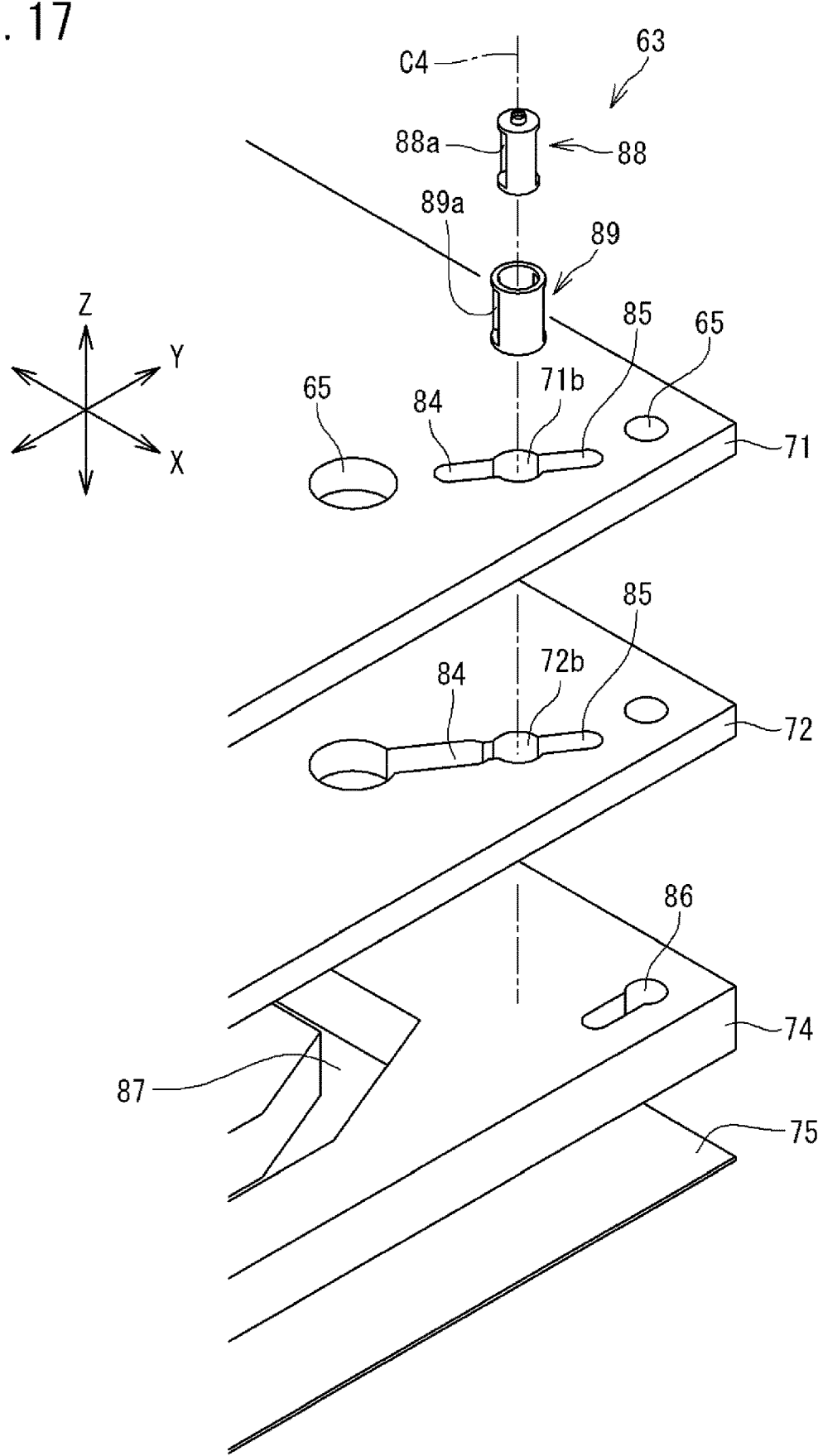
FIG. 17 is an exploded perspective view of a part of the first control valve.
Figure 18:
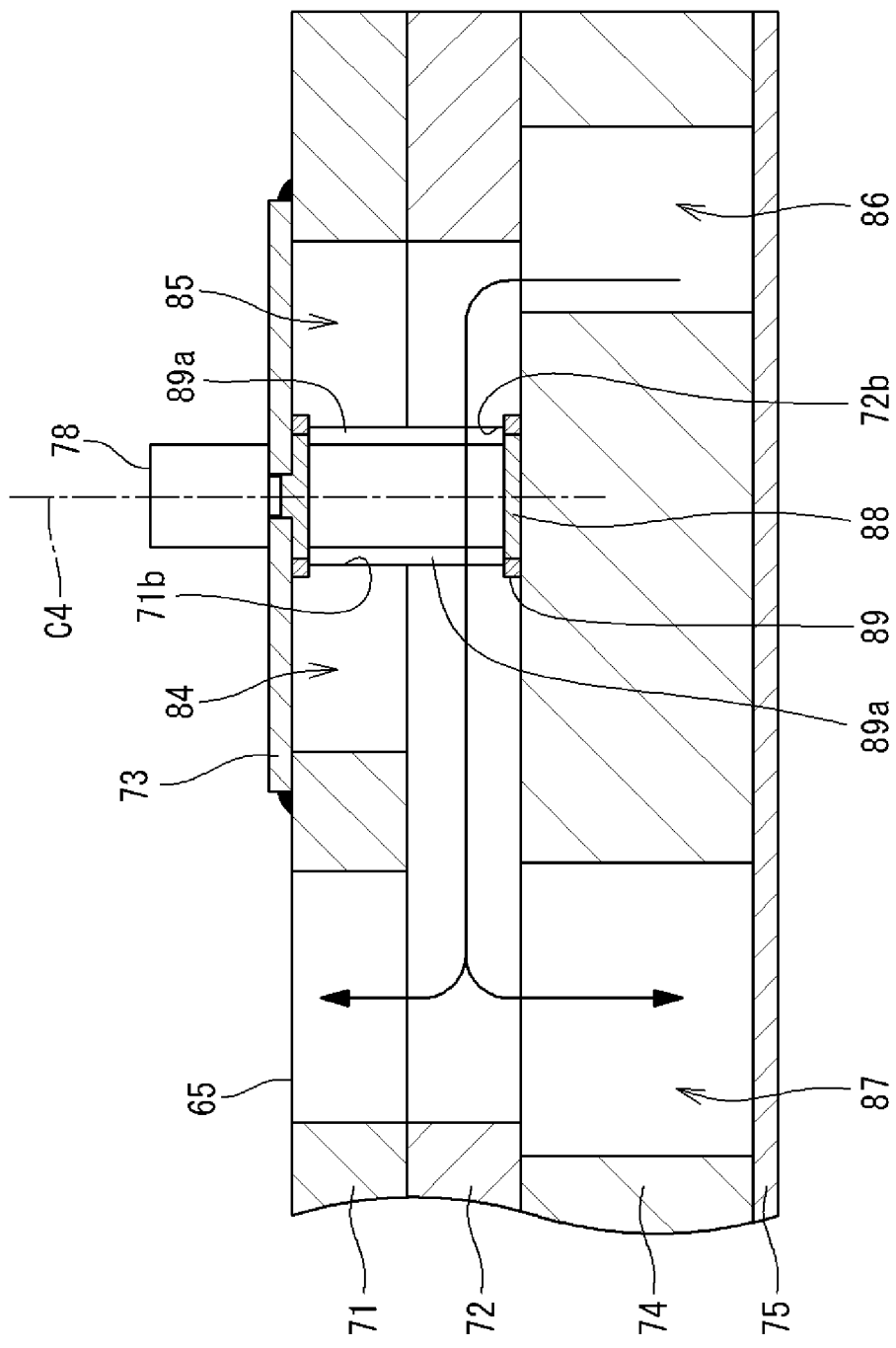
FIG. 18 is a sectional view illustrating the first control valve and a refrigerant flow path around the first control valve.

FIG. 17 is an exploded perspective view of a part of the first control valve. FIG. 18 is a sectional view illustrating the first control valve and a refrigerant flow path around the first control valve.

The valve body 88 of the first control valve 63 is equal in configuration to the valve bodies 43 of the first control valves 15, 21, and 22 described above with reference to, for example, FIG. 5. The valve body 88 of the first control valve 63 changes a flow of the refrigerant in the manner described above with reference to FIGS. 8A to 8C. The valve body 88 has a cylindrical shape and has an opening 88a passing through the valve body 88 in a direction perpendicular to an axial center C4 of the valve body 88. The valve body 88 has a height in the first direction Z, and this height is substantially equal to the sum of the thickness of the first plate 71 and the thickness of the second plate 72.

The valve body 88 is accommodated in an accommodation hole (first accommodation space) 71b bored in the first plate 71 and an accommodation hole (second accommodation space) 72b bored in the second plate 72 so as to extend over the accommodation hole 71b and the accommodation hole 72b. The axial center C4 of the valve body 88 extends in parallel with the first direction Z which is the normal direction of the first plate 71. The axial center C4 of the valve body 88 is aligned with centers of the accommodation holes 71b and 72b.

The first plate 71 and the second plate 72 are provided with a valve seat 89 that is in contact with the valve body 77. The valve seat 89 is equal in configuration to the valve seats 46 of the first control valves 15, 21, and 22 described above with reference to, for example, FIG. 5. The valve seat 89 has a cylindrical shape and has a pair of openings 89a passing through the valve seat 89 in a direction perpendicular to an axial center C4 of the valve seat 89. The valve seat 89 is fitted into and fixed to the two accommodation holes 71b and 72b in each of the first plate 71 and the second plate 72.

The first plate 71 and the second plate 72 each have the flow paths 84 and 85 respectively communicating with the accommodation holes 71b and 72b. The fourth plate 74 has flow paths 86 and 87 communicating with the flow paths 84 and 85. The first control valve 63 is configured to adjust a flow rate of the refrigerant flowing through the flow paths 84, 85, 86, and 87.

Figure 19:
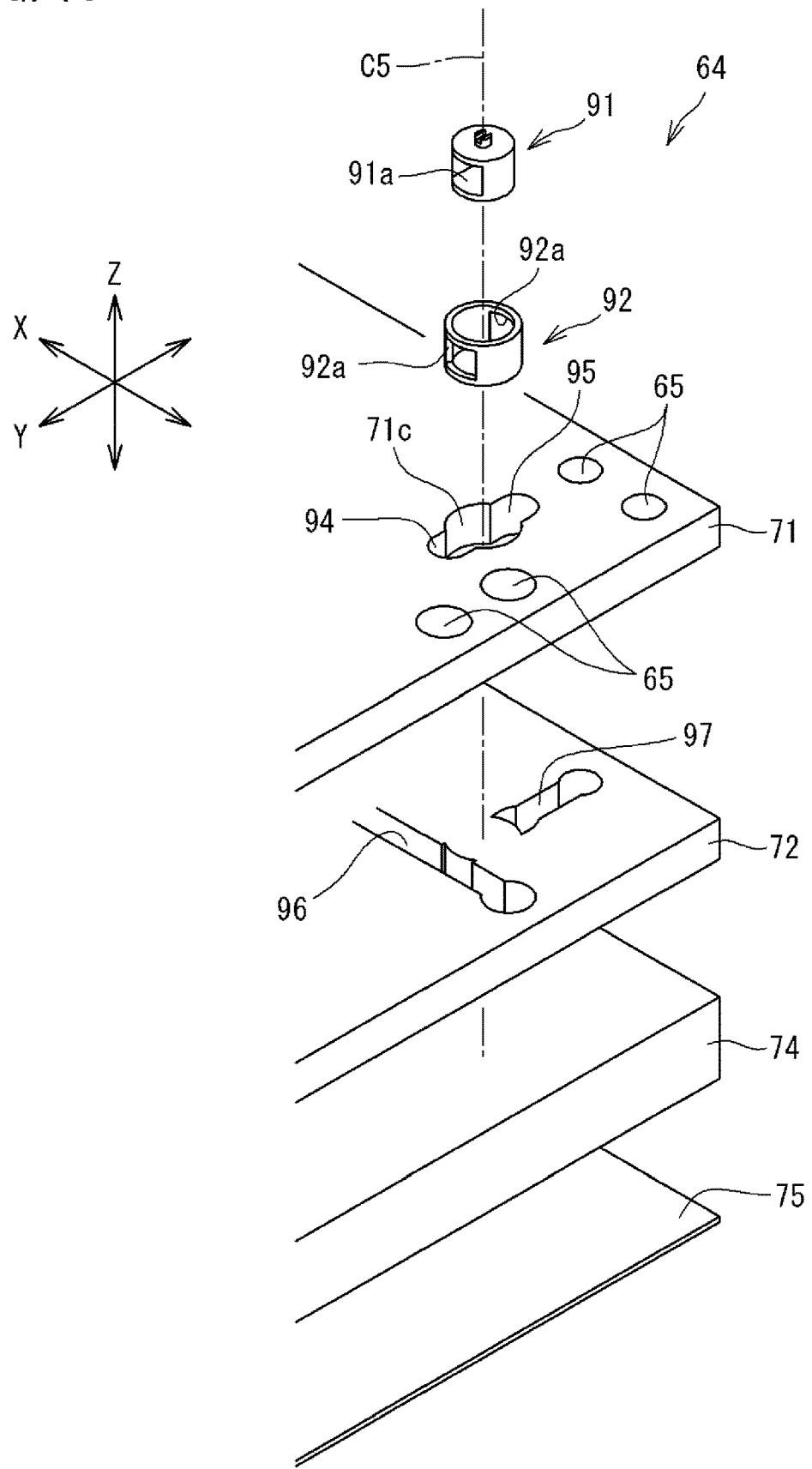
FIG. 19 is an exploded perspective view of a part of a first control valve according to another example.
Figure 20:
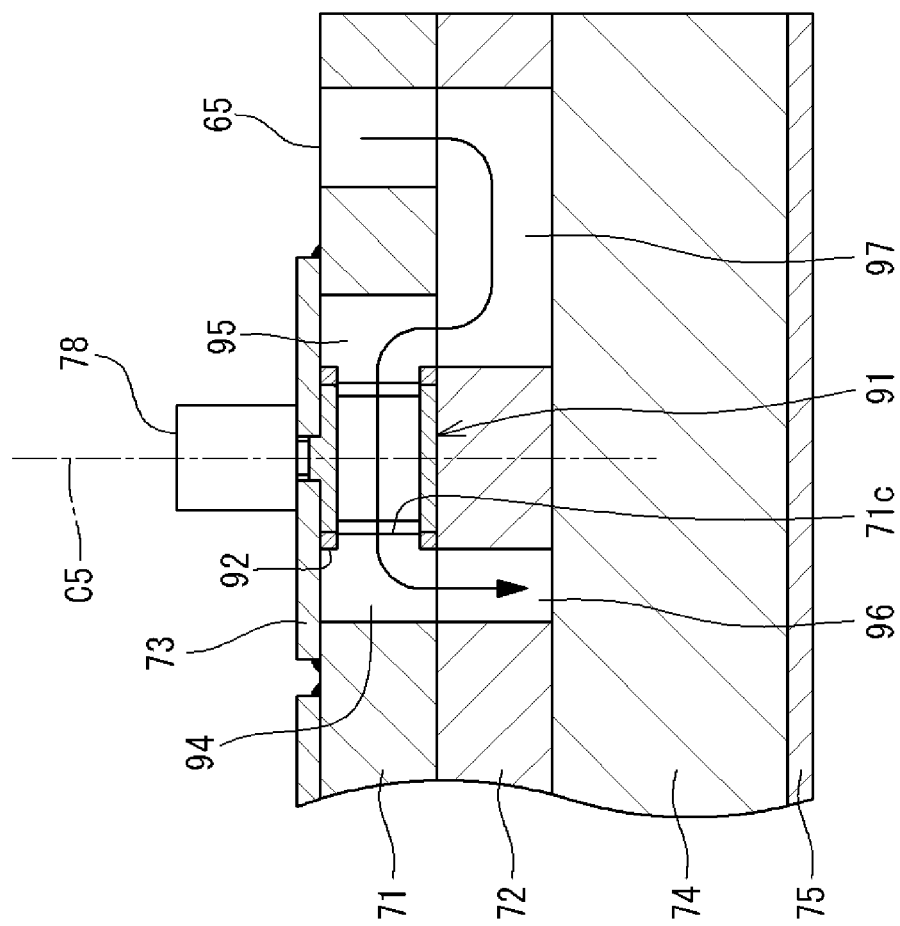
FIG. 20 is a sectional view illustrating the first control valve according to the another example and a refrigerant flow path around the first control valve.

FIG. 19 is an exploded perspective view of a part of a first control valve according to another example. FIG. 20 is a sectional view illustrating the first control valve according to the another example and a refrigerant flow path around the first control valve.

The first control valve 64 is a flow rate control valve, which is similar to the first control valve 63. The first control valve 64 includes a valve body 91 and a driver 78. The driver 78 is equal in configuration to the driver 45 described above with reference to, for example, FIG. 7.

The valve body 91 of the first control valve 64 is equal in configuration to the valve bodies 43 of the first control valves 15, 21, and 22 described above with reference to, for example, FIG. 5. The valve body 91 of the first control valve 64 changes a flow of the refrigerant in the manner described above with reference to FIGS. 8A to 8C. The valve body 91 has a cylindrical shape and has an opening 91a passing through the valve body 91 in a direction perpendicular to an axial center C5 of the valve body 91. The valve body 91 has a height in the first direction Z, and this height is substantially equal to a thickness of a first plate 71 in the first direction Z. Therefore, the height of the valve body 91 is lower than the height of the valve body 88 of the first control valve 63 illustrated in FIG. 17.

The valve body 91 is accommodated in an accommodation hole (first accommodation space) 71c bored in the first plate 71. The axial center C5 of the valve body 91 extends in parallel with the first direction Z which is the normal direction of the first plate 71. The axial center C5 of the valve body 91 is aligned with a center of the accommodation hole 71c.

The first plate 71 is provided with a valve seat 92 that is in contact with the valve body 91. The valve seat 92 is equal in configuration to the valve seats 46 of the first control valves 15, 21, and 22 described above with reference to, for example, FIG. 5. The valve seat 92 has a pair of openings 92a. The valve seat 89 is fitted into and fixed to the accommodation hole 71c bored in the first plate 71.

The first plate 71 has flow paths 94 and 95 communicating with the accommodation hole 71c. The second plate 72 has flow paths 96 and 97 communicating with the flow paths 94 and 95. The first control valve 64 is configured to adjust a flow rate of the refrigerant flowing through the flow paths 94, 95, 96, and 97.

Figure 21A:
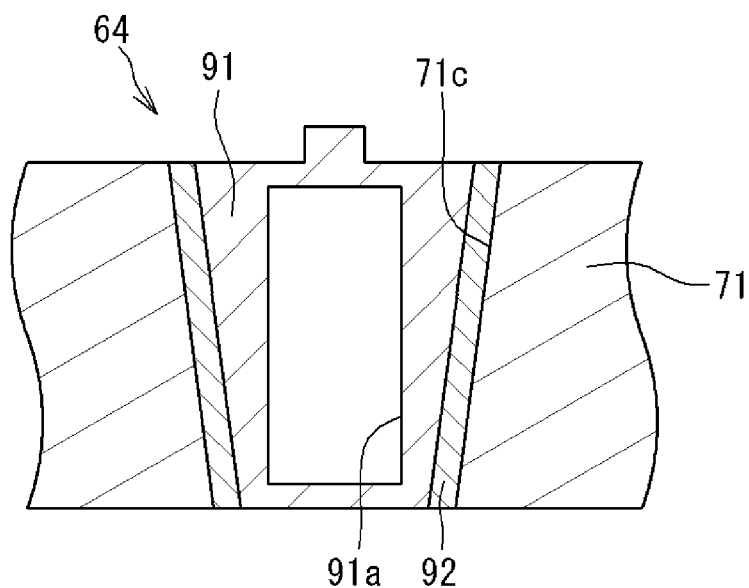
FIGS. 21A and 21B are sectional views respectively illustrating modifications of the first control valve according to the second embodiments.
Figure 21B:
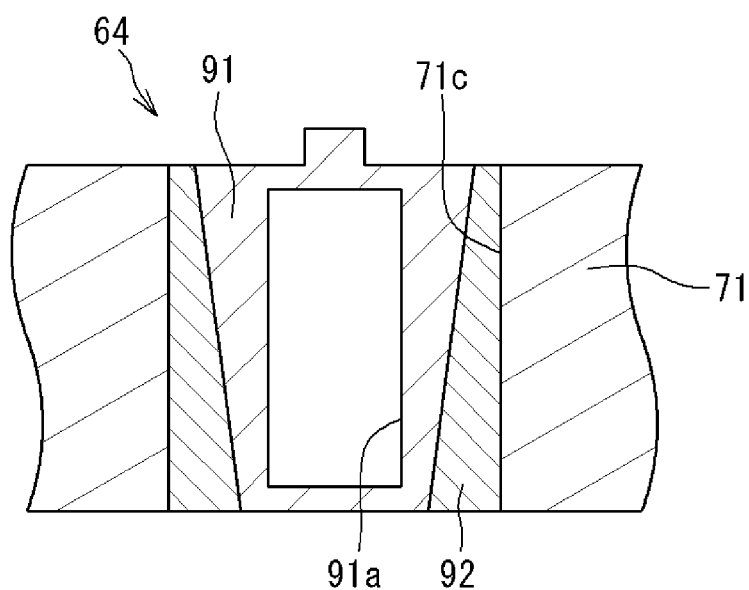

FIGS. 21A and 21B are sectional views respectively illustrating modifications of the first control valve according to the second embodiments.

As illustrated in FIG. 21A, a first control valve 64 includes a valve body 91 having a conical shape, more specifically a truncated cone shape. Likewise, a first plate 71 has an accommodation hole 71c having a truncated cone shape. A valve seat 92 fitted in the accommodation hole 71c also has a truncated cone shape.

As illustrated in FIG. 21B, a valve body 91 has a conical shape, more specifically a truncated cone shape. On the other hand, an accommodation hole 71c has a cylindrical shape. A valve seat 92 fitted into an accommodation hole 71c has a cylindrical outer peripheral surface and a conical (truncated cone-shaped) inner peripheral surface.

According to the modifications illustrated in FIGS. 21A and 21B, the valve body 91 is externally inserted into the accommodation hole 71c in the first plate 71 with ease. Therefore, the refrigerant pipe unit 60 is manufactured with ease. The conical valve body is also applicable to each of the control valves 15, 21, 22, and 17 described above in the first embodiments and each of the control valves 62 and 63 described above in the second embodiments.

Operation and Effects of One or More Embodiments

According to the refrigerant pipe unit disclosed in Patent Literature 1, the valve body is inserted in one of the plates and is configured to move, by linear motion, between a position to narrow the refrigerant flow path and a position to open the refrigerant flow path; therefore, this plate requires a space for allowing the valve body to move linearly. Consequently, the refrigerant pipe unit disclosed in Patent Literature 1 is less likely to achieve a size reduction in a direction in which the valve body moves. One or more embodiments of the present disclosure provide a compact refrigerant pipe unit and a refrigeration apparatus including the same.

(1) A refrigerant pipe unit 30, 60 according to each of the foregoing embodiments includes a first plate 51, 71, a second plate 52, 72 stacked on the first plate 51, 71, and a control valve 15, 17, 21, 22, 62, 63, 64. One of or both the first plate 51, 71 and the second plate 52, 72 includes or include a refrigerant flow path. The control valve includes a valve body 43, 44, 77, 88, 91 that includes a refrigerant passage (an opening) 43a, 44a, 77a, 88a, 91a communicating with the refrigerant flow path, is rotatably disposed in the first plate 51, 71, and is configured to change a flow of a refrigerant at the refrigerant flow path, in accordance with an amount of rotation, and a driver 45, 78 that is configured to adjust the amount of rotation of the valve body 43, 44, 77, 88, 91. The valve body 43, 44, 77, 88, 91 of the control valve 15, 17, 21, 22, 62, 63, 64 includes the refrigerant passage and rotates (changes its orientation) to change the flow of the refrigerant at the refrigerant flow path. This configuration therefore eliminates or considerably reduces a movement of the valve body 43, 44, 77, 88, 91 in changing the flow of the refrigerant (e.g., a linear movement in a radial direction or along an axial center of rotation C1, C2, C3, C4, C5 of the valve body 43, 44, 77, 88, 91). As a result, the first plate 51, 71 has almost no necessity to ensure a space that allows the movement of the valve body 43, 44, 77, 88, 91. This configuration thus achieves a reduction in size of the refrigerant pipe unit 30, 60.

In addition, the valve body 43, 44, 77, 88, 91 of the control valve changes the flow of the refrigerant at the refrigerant flow path, in accordance with the amount of rotation. Therefore, for example, an inlet-side refrigerant flow path through which the refrigerant flows into the refrigerant passage 43a, 44a, 77a, 88a, 91a in the valve body 43, 44, 77, 88, 91 and an outlet-side refrigerant flow path through which the refrigerant flows out of the refrigerant passage 43a, 44a, 77a, 88a, 91a can be arranged in a linear or planar form in a direction crossing the axial center of rotation C1, C2, C3, C4, C5 of the valve body 43, 44, 77, 88, 91. This configuration therefore reduces a space for the refrigerant flow paths in the direction of the axial center of rotation C1, C2, C3, C4, C5 of the valve body 43, 44, 77, 88, 91, and achieves a reduction in size of the refrigerant pipe unit 30, 60.

(2) In each of the foregoing embodiments, the refrigerant passage 43a, 44a, 77a, 88a, 91a defined in the valve body 43, 44, 77, 88, 91 extends in a direction perpendicular to the axial center of rotation C1, C2, C3, C4, C5 of the valve body 43, 44, 77, 88, 91. Specifically, the entire refrigerant passage 43a, 44a, 77a, 88a, 91a defined in the valve body 43, 44, 77, 88, 91 extends in the direction perpendicular to the axial center of rotation C1, C2, C3, C4, C5 of the valve body 43, 44, 77, 88, 91. Therefore, the inlet-side refrigerant flow path and the outlet-side refrigerant flow path can be arranged in the direction perpendicular to the axial center of rotation C1, C2, C3, C4, C5 of the valve body 43, 44, 77, 88, 91.

(3) In each of the foregoing embodiments, the valve body 43, 44, 77, 88, 91 has the axial center of rotation C1, C2, C3, C4, C5 extending in parallel with a normal direction of the first plate 51, 71. This configuration therefore achieves a reduction in size of the refrigerant pipe unit 30, 60 in the normal direction of the first plate 51, 71.

Specifically, the inlet-side refrigerant flow path through which the refrigerant flows into the refrigerant passage 43a, 44a, 77a, 88a, 91a in the valve body 43, 44, 77, 88, 91 and the outlet-side refrigerant flow path through which the refrigerant flows out of the refrigerant passage 43a, 44a, 77a, 88a, 91a in the valve body 43, 44, 77, 88, 91 can be arranged in the linear or planar form in the direction crossing the axial center of rotation C1, C2, C3, C4, C5 of the valve body 43, 44, 77, 88, 91 (i.e., the direction along the surface of the first plate 51, 71). This configuration therefore achieves a reduction in size of the refrigerant pipe unit 30 in the normal direction of the first plate 51, 71.

(4) In each of the foregoing embodiments, the first plate 51, 71 includes a first accommodation space 51h, 51j, 71a, 71b, 71c communicating with the refrigerant flow path, the valve body 43, 44, 77, 88, 91 is accommodated in the first accommodation space 51h, 51j, 71a, 71b, 71c, and the first plate 51, 71 is provided with a valve seat (a first valve seat) 46, 47, 79, 89, 92 that is in contact with the valve body 43, 44, 77, 88, 91 in the first accommodation space 51h, 51j, 71a, 71b, 71c. Therefore, the valve body 43, 44, 77, 88, 91 can be directly disposed in the first plate 51, 71, and the control valve can be constituted of the valve seat 46, 47, 79, 89, 92 disposed in the first plate 51, 71, the valve body 43, 44, 77, 88, 91, and the driver 45, 78. This configuration also achieves a reduction in size of the refrigerant pipe unit 30, 60.

(5) In each of the foregoing embodiments, the valve body 43, 44, 77, 88, 91 has a cylindrical shape or a conical shape. Therefore, the valve body 43, 44, 77, 88, 91 can be easily inserted into and accommodated in the first accommodation space 51h, 51j, 71a, 71b, 71c from the outside of the first plate 51, 71 along the axial center C1, C2, C3, C4, C5.

(6) In each of the foregoing embodiments, the valve seat 46, 47, 79, 89, 92 includes a sealing member disposed in the first plate 51, 71. This configuration therefore ensures hermeticity between the valve body 43, 44, 77, 88, 91 and the valve seat 46, 47, 79, 89, 92 corresponding to the sealing member and inhibits leakage of the refrigerant.

(7) In the second embodiments, the second plate 72 includes a second accommodation space 72a, 72b communicating with the refrigerant flow path, and the valve body 77, 88 is accommodated in the first accommodation space 71a, 71b and the second accommodation space 72a, 72b so as to extend over the first accommodation space 71a, 71b and the second accommodation space 72a, 72b. The second plate 72 is provided with a valve seat (a second valve seat) 79, 89 that is in contact with the valve body 77, 88 in the second accommodation space 72a, 72b. As described above, the valve body 77, 88 is disposed on the two plates 71 and 72 so as to extend over the two plates 71 and 72, which leads to an increase in flow rate of the refrigerant through the control valve. In the second embodiments, the first valve seat 79, 89 disposed in the first accommodation space 71a, 71b is integrated with the second valve seat 79, 89 disposed in the second accommodation space 72a, 72b. The first valve seat 79, 89 may alternatively be provided separately from the second valve seat 79, 89.

(8) In each of the foregoing embodiments, the refrigerant pipe unit further includes a third plate 53, 73 that is stacked on the first plate 51, 71, is disposed opposite the second plate 52, 72 across the first plate 51, 71 in a normal direction of the first plate 51, 71, and covers the valve body 43, 44, 77, 88, 91, a brazing portion joining the first plate 51, 71 and the second plate 52, 72 together, and a welding portion joining the first plate 51, 71 and the third plate 53, 73 together. Therefore, the first plate 51, 71 and the second plate 52, 72, which are the constituent elements of the unit main body 41, 61 other than the third plate 53, 73, can be integrated with each other by brazing. Thereafter, the valve body 43, 44, 77, 88, 91 of the control valve can be accommodated in one of or both the first plate 51, 71 and the second plate 52, 72. The third plate 53, 73 can be mounted to the first plate 51, 71. The valve body 43, 44, 77, 88, 91 can be covered with the third plate 53, 73. Hence, the valve body 43, 44, 77, 88, 91 and the valve seat 46, 47, 79, 89, 92 can be less susceptible to a thermal influence in joining the first plate 51, 71 and the second plate 52, 72 by brazing.

(9) In each of the foregoing embodiments, the refrigerant pipe unit 30, 60 further includes a first control valve 15, 21, 22, 63, 64 configured to adjust the flow rate of the refrigerant in accordance with the amount of rotation of the valve body 43, 88, 91, and a second control valve 17, 62 configured to switch the flow direction of the refrigerant in accordance with the amount of rotation of the valve body 44, 77. This configuration allows the refrigerant pipe unit 30, 60 to have a function of controlling multiple flows of the refrigerant.

The present disclosure is not limited to the foregoing exemplary description, and all changes that fall within metes and bounds of the claims, or equivalence such metes and bounds thereof are therefore intended to be embraced by the claims.

For example, the accommodation space accommodating the valve body is not limited to the accommodation hole passing through one of or both the first plate and the second plate. The accommodation space accommodating the valve body may alternatively be an accommodation recess to be formed by recessing the surface of one of the first plate and the second plate or recessing surfaces of both the first plate and the second plate.

The refrigerant passage in the valve body is not limited to the hole passing through the valve body. The refrigerant passage may alternatively be a recessed groove to be formed in the outer peripheral surface of the valve body. The valve body of the control valve may be accommodated in only the second plate. The valve body may be disposed in the refrigerant pipe unit with the axial center oriented toward a direction crossing the first direction.

In each of the foregoing embodiments, the valve seat is configured with the sealing member provided separately from one of or both the first plate and the second plate. However, the sealing member is omittable. For example, the valve body is brought into direct contact with the inner peripheral surface of the accommodation hole in one of the first plate and the second plate or the inner peripheral surfaces of the accommodation holes in both the first plate and the second plate. The inner peripheral portion of the accommodation hole can thus be used as the valve seat.

In the foregoing embodiments, the hole, through which the another refrigerant pipe is connected to the flow path in the unit main body, is bored in the upper surface of the unit main body (i.e., the upper surface of the first or third plate). The hole may alternatively be bored in a lower surface or a side surface of the unit main body.

The valve body may have, for example, a spherical shape in addition to the cylindrical shape or the conical shape.

The control valve may include a casing accommodating the valve body and including a valve seat that is in contact with the valve body. The control valve may be disposed together with the casing in one of or both the first plate and the second plate.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 refrigeration apparatus
15 outdoor expansion valve (first control valve)
17 four-way switching valve (second control valve)
21 supercooling expansion valve (first control valve)
22 open-close valve (first control valve)
refrigerant pipe unit
31 first flow path
32 second flow path
33 third flow path
34 fourth flow path
fifth flow path
36 sixth flow path
37 seventh flow path
38 eighth flow path
39 ninth flow path
tenth flow path
43 valve body
43a opening (refrigerant passage)
44 valve body
44a opening (refrigerant passage)
driver
51 first plate
52 second plate
53 third plate
60 refrigerant pipe unit
62 second control valve
63 first control valve
64 first control valve
71 first plate
71a accommodation hole (first accommodation space)
71b accommodation hole (first accommodation space)
71c accommodation hole (first accommodation space)
72 second plate
72a accommodation hole (second accommodation space)
72b accommodation hole (second accommodation space)
73 third plate
77 valve body
77a opening (refrigerant passage)
78 driver
88 valve body
88a opening (refrigerant passage)
89 valve seat
91 valve body
91a opening (refrigerant passage)
92 valve seat
Z first direction (normal direction of first plate)

What is claimed is:

1. A refrigerant pipe unit comprising:
a first plate;
a second plate stacked on the first plate; and
a control valve, wherein
both of the first plate and the second plate include a refrigerant flow path, and
the control valve comprises:
a valve body that:
includes a refrigerant passage communicating with the refrigerant flow path,
rotates in the first plate around a central axis extending parallel to a direction in which the second plate is stacked on the first plate, and
changes a flow of a refrigerant in the refrigerant flow path with an amount of rotation of the valve body; and
a driver that adjusts the amount of the rotation of the valve body.

2. The refrigerant pipe unit according to claim 1, wherein the refrigerant passage extends in a direction perpendicular to a central axis of the rotation of the valve body.

3. The refrigerant pipe unit according to claim 1, wherein the valve body has a central axis of the rotation extending perpendicular to the first plate.

4. The refrigerant pipe unit according to claim 1, wherein
the first plate includes a first accommodation space communicating with the refrigerant flow path,
the valve body is disposed in the first accommodation space, and
the first plate comprises a first valve seat that is in contact with the valve body in the first accommodation space.

5. The refrigerant pipe unit according to claim 4, wherein the valve body has a cylindrical shape or a conical shape.

6. The refrigerant pipe unit according to claim 4, wherein the first valve seat comprises a seal disposed in the first plate.

7. The refrigerant pipe unit according to claim 1, further comprising:
a first control valve that adjusts a flow rate of the refrigerant with an amount of rotation of a valve body of the first control valve; and
a second control valve that switches a flow direction of the refrigerant with an amount of rotation of a valve body of the second control valve.

8. A refrigeration apparatus comprising the refrigerant pipe unit according to claim 1.

9. A refrigerant pipe unit comprising:
a first plate;
a second plate stacked on the first plate; and
a control valve, wherein
one or both of the first plate and the second plate include a refrigerant flow path,
the control valve comprises:
a valve body that:
includes a refrigerant passage communicating with the refrigerant flow path,
rotates in the first plate around a central axis extending parallel to a direction in which the second plate is stacked on the first plate, and
changes a flow of a refrigerant in the refrigerant flow path with an amount of rotation of the valve body; and
a driver that adjusts the amount of the rotation of the valve body,
the first plate includes a first accommodation space communicating with the refrigerant flow path,
the first plate comprises a first valve seat that is in contact with the valve body in the first accommodation space,
the second plate includes a second accommodation space communicating with the refrigerant flow path,
the valve body is disposed in the first accommodation space and the second accommodation space and extends over the first accommodation space and the second accommodation space, and
the second plate comprises a second valve seat that is in contact with the valve body in the second accommodation space.

10. A refrigerant pipe unit comprising:
a first plate;
a second plate stacked on the first plate; and
a control valve, wherein
one or both of the first plate and the second plate include a refrigerant flow path, and
the control valve comprises:
  a valve body that:
    includes a refrigerant passage communicating with the refrigerant flow path,
    rotates in the first plate around a central axis extending parallel to a direction in which the second plate is stacked on the first plate, and
    changes a flow of a refrigerant in the refrigerant flow path with an amount of rotation of the valve body; and
  a driver that adjusts the amount of the rotation of the valve body,
the refrigerant pipe unit further comprises:
  a third plate stacked on the first plate opposite the second plate across the first plate in a normal direction of the first plate and that covers the valve body;
  a brazing portion joining the first plate and the second plate together; and
  a welding portion joining the first plate and the third plate together.

* * * * *